(12) United States Patent
Shmueli et al.

(10) Patent No.: US 11,282,401 B2
(45) Date of Patent: Mar. 22, 2022

(54) MULTI-DIMENSION OPERATION OF AUTONOMOUS VEHICLES

(71) Applicant: Blue White Robotics Ltd, Tel Aviv (IL)

(72) Inventors: Aviram Shmueli, Modi'in (IL); Alon Ascher, Tel Aviv (IL); Ben Alfi, Tel Aviv (IL); Shmuel Ur, Shorashim (IL)

(73) Assignee: Blue White Robotics Ltd, Tel Aviv (IL)

( * ) Notice: Subject to any disclaimer, the term of this patent is extended or adjusted under 35 U.S.C. 154(b) by 82 days.

(21) Appl. No.: 16/826,369

(22) Filed: Mar. 23, 2020

(65) Prior Publication Data

US 2021/0295724 A1 Sep. 23, 2021

(51) Int. Cl.
*G08G 9/00* (2006.01)
*G05D 1/02* (2020.01)
*G05D 1/10* (2006.01)

(52) U.S. Cl.
CPC .............. *G08G 9/00* (2013.01); *G05D 1/021* (2013.01); *G05D 1/0206* (2013.01); *G05D 1/101* (2013.01)

(58) Field of Classification Search
CPC ...... G05D 1/0206; G05D 1/021; G05D 1/101; G05D 1/104; G05D 2201/0207; G08G 9/00; A01B 1/00–79/00
See application file for complete search history.

(56) References Cited

U.S. PATENT DOCUMENTS

| | | | | |
|---|---|---|---|---|
| 2016/0146611 | A1* | 5/2016 | Matthews | G05D 1/0291 701/533 |
| 2016/0327959 | A1* | 11/2016 | Brown | G05D 1/104 |
| 2018/0344114 | A1* | 12/2018 | Scholten | A47L 9/2894 |
| 2020/0019159 | A1* | 1/2020 | Kocer | G05D 1/0219 |

* cited by examiner

Primary Examiner — Aaron L Troost

(57) ABSTRACT

Described herein are methods and systems for automatically operating autonomous vehicles to accomplish a coverage task by receiving a plurality of task parameters defining a coverage task in a certain geographical area, calculating and outputting instructions for operating first autonomous vehicle(s) to cover the certain geographical area according to a first movement path computed according to operational parameters of the first autonomous vehicle with respect to the task parameters, identifying uncovered segment(s) in the certain geographical area by analyzing coverage of the certain geographical, and calculating and outputting instructions for operating second autonomous vehicle(s) to cover the uncovered segment(s) according to a second movement path computed according to operational parameters of the second autonomous vehicle. The first autonomous vehicle(s) and the second autonomous vehicle(s) are selected to optimally accomplish the coverage task. The second autonomous vehicle having increased coverage precision and reduced coverage rate compared to the first autonomous vehicle.

19 Claims, 8 Drawing Sheets

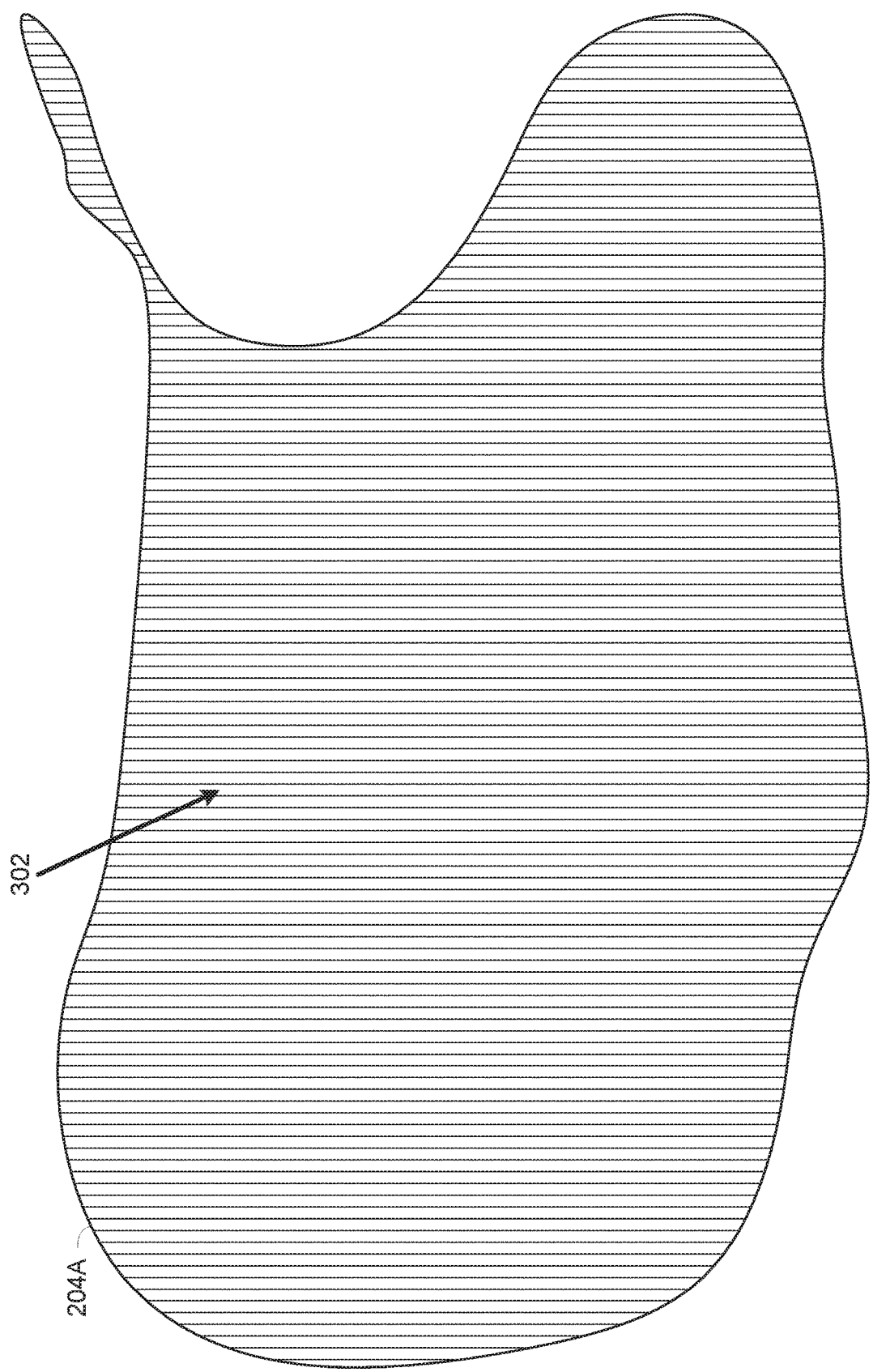

MULTI-DIMENSION OPERATION OF AUTONOMOUS VEHICLES

FIELD AND BACKGROUND OF THE INVENTION

The present invention, in some embodiments thereof, relates to operating autonomous vehicles to accomplish a coverage task, and, more specifically, but not exclusively, to iteratively operating different types of autonomous vehicles to optimally accomplish a coverage task according to operational parameters of the different autonomous vehicles.

In the past, the use of autonomous vehicles either ground, aerial and/or naval vehicles was mainly restricted to military applications and uses due to the high cost of this technology and the resources required for deploying and maintaining such autonomous vehicles.

However, recent years have witnessed constant advancements in autonomous vehicles technology presenting constantly increasing operational capabilities and increased availability of cost effective autonomous vehicles solutions. These have led to appearance and rapid evolution of a plurality of commercial, agricultural, environment preservation and other autonomous vehicles based applications, systems and services.

SUMMARY OF THE INVENTION

According to a first aspect of the present invention there is provided a method of automatically operating autonomous vehicles to accomplish a coverage task, comprising:
Receiving a plurality of task parameters defining a coverage task in a certain geographical area.
Calculating and outputting instructions for operating one or more first autonomous vehicles selected to cover at least partially the certain geographical area according to a first movement path computed according to one or more operational parameters of the first autonomous vehicle with respect to one or more of the plurality of task parameters.
Identifying one or more uncovered segments of a plurality of segments constituting the certain geographical area by analyzing coverage of the certain geographical area by the one or more first autonomous vehicles operated according to the first movement path.
Calculating and outputting instructions for operating one or more second autonomous vehicles selected to cover one or more of the uncovered segments according to a second movement path computed according to one or more operational parameters of the second autonomous vehicle.
Wherein the one or more first autonomous vehicles and the one or more second autonomous vehicles are selected to optimally accomplish the coverage task. The second autonomous vehicle having increased coverage precision and reduced coverage rate compared to the first autonomous vehicle.

According to a second aspect of the present invention there is provided a system for automatically operating autonomous vehicles to accomplish a coverage task, comprising one or more input interfaces, one or more output interfaces, and one or more processors coupled to the one or more input interfaces and to the one or more output interfaces, the one or more processor executing a code comprising:

Code instructions to receive, via one or more of the input interfaces, a plurality of task parameters defining a coverage task in a certain geographical area;
Code instructions to calculate and output, via one or more of the output interfaces, instructions for operating one or more first autonomous vehicles selected to cover at least partially the certain geographical area according to a first movement path computed according to one or more operational parameters of the first autonomous vehicle with respect to one or more of the plurality of task parameters.
Code instructions to identify one or more uncovered segments of a plurality of segments constituting the certain geographical area by analyzing coverage of the certain geographical area by the one or more first autonomous vehicles operated according to the first movement path.
Code instructions to calculate and output, via one or more of the output interfaces, instructions for operating one or more second autonomous vehicles selected to cover one or more of the uncovered segments according to a second movement path computed according to one or more operational parameters of the second autonomous vehicle.
Wherein the one or more first autonomous vehicles and the one or more second autonomous vehicles are selected to optimally accomplish the coverage task. The second autonomous vehicle having increased coverage precision and reduced coverage rate compared to the first autonomous vehicle.

In a further implementation form of the first and/or second aspects, each of the first autonomous vehicle and the second autonomous vehicle is a member of a group consisting of: a ground vehicle, an aerial vehicle and a naval vehicle.

In a further implementation form of the first and/or second aspects, the coverage task comprising one or more operations of a group consisting of: a monitoring operation, an agricultural operation, a picking operation and a placing operation.

In a further implementation form of the first and/or second aspects, each of the plurality of task parameters defines one or more members of a group consisting of: an operation of the task, a timing of the task, a duration of the task, a revenue of the task, a cost of the task, a size of the certain geographical area, a location of the certain geographical area, a type of the certain geographical area and an outcome of the task.

In a further implementation form of the first and/or second aspects, each of the plurality of operational parameters of a respective autonomous vehicle is a member of a group consisting of: a type of the autonomous vehicle, an availability of the autonomous vehicle, a speed of the autonomous vehicle, an energy related operation time expectancy, a maximal altitude of the autonomous vehicle, a minimal altitude of the autonomous vehicle, a range of the autonomous vehicle, a communication range, a load capability of the autonomous vehicle, a coverage precision of the autonomous vehicle, a coverage rate of the autonomous vehicle, a current location and/or a cost of operation of the autonomous vehicle.

In a further implementation form of the first and/or second aspects, the coverage of the certain geographical area is determined by analyzing sensory data captured by one or more sensors deployed to monitor at least part of the certain geographical area.

In a further implementation form of the first and/or second aspects, one or more of the sensors are deployed in one or more of first autonomous vehicles.

In a further implementation form of the first and/or second aspects, one or more of the sensors are deployed in one or more of the second autonomous vehicles.

In a further implementation form of the first and/or second aspects, one or more of the sensors are deployed in one or more monitoring autonomous vehicles operated in the certain geographical area.

In a further implementation form of the first and/or second aspects, each of the one or more uncovered segments includes a fully uncovered segment, a partially uncovered segment and/or an uncertainly covered segment.

In an optional implementation form of the first and/or second aspects, one or more second autonomous vehicles are operated, based on the coverage analysis, in a part of the certain geographical area already covered by the one or more first autonomous vehicles while the one or more first autonomous vehicles are still operated in another part of the certain geographical.

In an optional implementation form of the first and/or second aspects, one or more first autonomous vehicles are selected according to selection of the one or more second autonomous vehicles.

In an optional implementation form of the first and/or second aspects, coverage is analyzed after the one or more second autonomous vehicles are operated to cover the one or more uncovered segments to identify one or more additional uncovered segments of the plurality of segments.

In an optional implementation form of the first and/or second aspects, one or more additional iterations are initiated for calculating and outputting instructions for operating the one or more second autonomous vehicles are according to another second movement path computed according to one or more operational parameters of the one or more second autonomous vehicle to at least partly cover the one or more additional uncovered segments.

In an optional implementation form of the first and/or second aspects, one or more third autonomous vehicles are selected for the one or more additional iterations and calculating and outputting instructions for operating the one or more third autonomous vehicles according to a third movement path computed according to one or more operational parameters of the third autonomous vehicle to at least partly cover the one or more additional uncovered segments.

In a further implementation form of the first and/or second aspects, the optimal accomplishment of the task is estimated based on a minimal number of autonomous vehicles deployed to complete the task.

In a further implementation form of the first and/or second aspects, the optimal accomplishment of the task is estimated based on a minimal cost of the autonomous vehicles deployed to complete the task.

In a further implementation form of the first and/or second aspects, the optimal accomplishment of the task is estimated based on a minimal time for completing the task.

In a further implementation form of the first and/or second aspects, the optimal accomplishment of the task is estimated based on a minimal duration time of the task.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3A, FIG. 3B, FIG. 3C, FIG. 3D, FIG. 3E and FIG. 3F are schematic illustration of an exemplary certain geographical area gradually covered by iteratively operating different autonomous vehicles to optimally accomplish coverage of the certain geographical area, according to some embodiments of the present invention.

DESCRIPTION OF SPECIFIC EMBODIMENTS OF THE INVENTION

Figure 1:
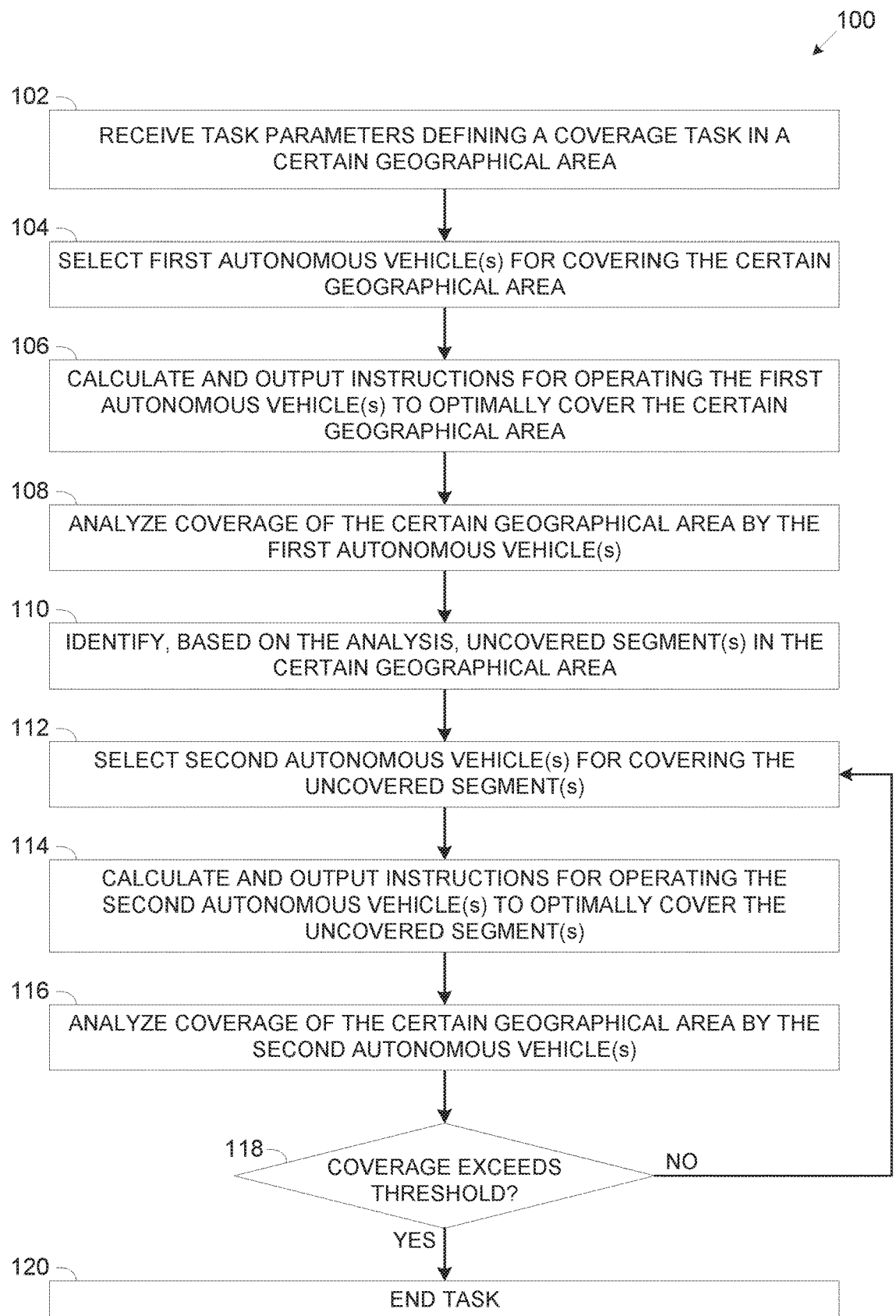
FIG. 1 is a flowchart of an exemplary process of iteratively operating different autonomous vehicles to optimally accomplish a coverage task, according to some embodiments of the present invention.

The present invention, in some embodiments thereof, relates to operating autonomous vehicles to accomplish a coverage task, and, more specifically, but not exclusively, to iteratively operating different types of autonomous vehicles to optimally accomplish a coverage task according to operational parameters of the different autonomous vehicles.

According to some embodiments of the present invention, there are provided methods, systems and computer program products for selecting and operating a plurality of autonomous vehicles, for example, ground, aerial and/or naval vehicles of different types and operable in different dimensions (multi-dimension) to gradually complete a coverage task in a certain geographical area in an optimal manner according a plurality of according to the task parameters (requirements) defining the task.

The coverage task directed to cover the certain geographical area may include one or more operations, for example, a monitoring operation of the area to identify one or more objects in the certain geographical area, a photography operation of the area to capture imagery data of the certain geographical area, a picking operation for picking items detected in the certain geographical area, a placing operation for placing items in the certain geographical area and/or the like. The coverage task may further include one or more agricultural operations in the certain geographical area such as, for example, a farm, a field, an orchard, a garden, a plantation, a livestock grazing area (pasture), a fish pond and/or the like. Such agricultural operations may include, for example, spraying one or more materials (e.g. water, fertilizers, pesticides, etc.), picking agricultural items (e.g. fruit, vegetable, eggs, etc.), irrigating crops, pollinating crops, pruning crops, trimming crops, seeding the area and/or the like.

As such the task parameters may relate to the coverage task, for example, type of operation(s), timing requirements (e.g. completion time, duration, etc.), cost and/or the like as well as to the certain geographical area, for example, a location, a size, a terrain type, and/or the like.

The gradual coverage of the certain geographical area is optimized by applying three main concepts applied to comply with the task parameters of the coverage task. The first concept is executing an iterative process where in each iteration one or more autonomous vehicles of a certain type of autonomous vehicles are selected and operated to cover the certain geographical area according to their operational parameters, for example, a coverage rate, a coverage precision, a speed, a range, a load capacity, an energy related operation time expectancy (i.e. operation time based on energy availability), an operational cost and/or the like.

The second concept is analyzing coverage of the certain geographical area following each iteration and selecting another type of the autonomous vehicles to effectively cover uncovered sections or segments of the certain geographical area which were not fully covered by the autonomous vehicles selected in the previous iteration and/or segments of the certain geographical area which cannot be definitively determined as fully covered. One or more of the uncovered segments may be uncovered due to one or more limitations in the operational parameters of the autonomous vehicles selected and operated to cover the certain geographical area, for example, limited operation time, limited range, limited load capacity, limited coverage precision and/or the like. However, one or more of the uncovered segments may be uncovered due to discrepancies between the actual coverage of the autonomous vehicles selected to cover the certain geographical area and the predicted coverage estimated based on the coverage capabilities of the selected autonomous vehicles. Such discrepancies may result from environmental and/or weather conditions, for example, wind, limited visibility, precipitation and/or the like which may affect the actual coverage capacity of the autonomous vehicles compared to a nominal and/or predicted coverage capacity. Therefore, analyzing the actual coverage of certain geographical area in real-time following each iteration may reveal theses uncovered segment(s) and section(s).

Furthermore, based on the real-time analysis of the actual coverage may enable detection of unexpected operation and/or deviation of the autonomous vehicle(s) selected in the preceding iteration from their expected operational parameters resulting in the reduced coverage compared to the expected coverage. This may allow further adjusting and/or adapting the selection and the operation instruction for autonomous vehicles in one or more succeeding (additional) iterations in order to efficiently and effectively cover the uncovered segment(s).

The third concept is selecting the autonomous vehicle(s) in each of the iterations to optimally cover the certain geographical area in an optimal manner defined by one or more optimization functions, for example, a certain number of deployed autonomous vehicles, a minimal number of deployed autonomous vehicles, a minimal cost of deployment, a minimal time, a minimal duration time of and/or the like.

In each iteration of the process, the selected autonomous vehicle(s) of the certain type may be operated to cover at least partially the certain geographical area and/or part thereof according to movement path(s) computed according to the operational parameters of the selected autonomous vehicle(s). As such, in a first iteration, the selected autonomous vehicle(s) of a first type may be operated in optimal movement path(s) to cover at least partially the certain geographical area. After the selected autonomous vehicle(s) complete their operation, the coverage of the certain geographical area may be analyzed to identify one or more uncovered segments which were not fully covered in the first iteration and/or may not be decisively determined as being fully covered. In a second iteration, selected autonomous vehicle(s) of a second type may be operated in movement path(s) to cover at least partially one or more of the uncovered segment(s) identified in the coverage analysis. The iterative process may be repeated (additional iterations) using one or more autonomous vehicles of the same and/or other types until reaching or exceeding one or more thresholds defined by the task requirements.

The coverage analysis may be conducted by analyzing sensory data, captured by one or more sensors configured to depict the certain geographical area following each iteration, for example, imaging sensors, sound sensors, ranging sensors and/or the like. These sensor(s) may be deployed and/or mounted in the autonomous vehicle(s) selected and operated in the certain geographical area in the previous iteration and/or in the succeeding iteration. For example, the imagery data of the certain geographical area after the first iteration may be captured during the first iteration by sensor(s) mounted on the autonomous vehicle(s) of the first type selected and operated in the first iteration. In another example, the imagery data of the certain geographical area after the first iteration may be captured during the second iteration by other sensor(s) mounted on other autonomous vehicle(s) of the second type selected and operated in the second iteration. In another example, the imager data relating to one or more of the iterations may be captured by one or more monitoring autonomous vehicles other than those selected and operated to actually conduct the coverage operations in the certain geographical area.

Following the third concept, selection of the autonomous vehicles in each iteration is done according to the optimization function(s). Typically, the coverage task may be executed by initially selecting and operating higher coverage rate autonomous vehicles which may present somewhat reduced coverage precision. This step may be followed by one or more iterations in which higher coverage precision autonomous vehicle(s) may be selected and operated to cover uncovered segments which the high coverage rate autonomous vehicles failed to properly cover However, other selection methodologies may be applied according to the task parameters to optimally accomplish the coverage task.

Optionally, two successive iterations may be conducted simultaneously (concurrently, in parallel) such that autonomous vehicle(s) of a two different types are operated simultaneously in the certain geographical area. For example, the autonomous vehicle(s) of a second type may be operated in one or more first parts or portions of the certain geographical area which are already covered by the autonomous vehicle(s) of a first type while the autonomous vehicle(s) of a first type are still operated in one or more other (second) parts or portions of the certain geographical area. In particular, the coverage of one or more of the first parts already covered by the autonomous vehicle(s) of a first type may be analyzed, and based on the coverage analysis, the autonomous vehicle(s) of a second type may be operated in the first part(s) simultaneously with the autonomous vehicle(s) of a first type operated in the second part(s).

Optimizing the coverage task by iteratively selecting and operating a plurality of different autonomous vehicles having different operational parameters may present major benefits and advantages compared to existing methods and system for operating autonomous vehicles to accomplish the coverage task.

First, the existing (traditional) methods for operating autonomous vehicles to accomplish the coverage task typically use a single type of autonomous vehicle(s) which may be limited in one or more of its operational parameters, for example, coverage rate, coverage precision, speed, range, operational cost and/or the like. This limitation(s) may significantly increase the resources (e.g. autonomous vehicles, maintenance, etc.), time and/or cost for completing the coverage task. In contrast, the coverage task optimization employs multiple types of autonomous vehicles which are different from each other in their operational parameters and may be therefore selected and operated according to their specific operational parameters with respect to the to effectively and efficiently complete the coverage task in an optimal manner thus reducing resources, time and/or cost for accomplishing the task.

Moreover, by analyzing the imagery data captured following each iteration to determine the coverage of the certain geographical area, may reveal uncovered segment(s) which were are uncovered and/or partially covered due to one or limited coverage effects induced by the environmental and/or weather condition(s). The coverage analysis may further optimize the selection and operation of the autonomous vehicle(s) in the succeeding iteration according to the identified uncovered segment(s), for example, their number, their location, their size and/or the like, optionally according to the identified environmental and/or weather condition(s) and/or real-time availability constrains. It may be possible to accomplish the coverage task by investing and/or applying excessive resources (e.g. time, materials, vehicles, costs, etc.) which may be redundant and thus costly as may be done by the existing methods. In contrast, analyzing the imagery data as done in the present invention may establish a closed loop process in which the feedback, i.e. the imagery data analysis may be used to optimize the process and thus significantly reduce the resources required to accomplish the same coverage task.

Furthermore, by applying one or more optimization functions, the selection and operation of the autonomous vehicle(s) in the succeeding iteration may be optimized in an extremely flexibly manner to comply with the exact specific task parameters defined for each coverage task.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The computer readable program instructions may be further executed as one or more web and/or cloud based applications either connected or disconnected to the internet in real-time. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of iteratively operating different autonomous vehicles to optimally accomplish a coverage task, according to some embodiments of the present invention. An exemplary process 100 may be executed to select a plurality of different autonomous vehicles operable in different dimensions (multi-dimension), for example, ground vehicles, aerial vehicles and/or naval vehicles in a plurality of iterations to gradually complete a coverage task in a certain geographical area in an optimal manner with respect to a plurality of requirements defining the task.

The coverage task directed to cover the certain geographical area may include one or more operations, for example, a monitoring operation to identify one or more objects in the certain geographical area, a photography operation of the area to capture imagery data of the certain geographical area, a picking operation for picking items detected in the certain geographical area, a placing operation for placing items in the certain geographical area and/or the like.

The coverage task may further include one or more agricultural operations in the certain geographical area such as, for example, a farm, a field, an orchard, a garden, a plantation, a livestock grazing area (pasture), a fish pond and/or the like. Such agricultural operations may include, for example, spraying one or more materials (e.g. water, fertilizers, pesticides, etc.), picking agricultural items (e.g. fruit, vegetable, eggs, etc.), irrigating crops, pollinating crops, pruning crops, trimming crops, seeding the area and/or the like.

The coverage task may be further defined in other dimensions, for example, a horizontal dimension and a vertical dimension. Specifically, while the coverage task may define the horizontal dimension of the certain geographical area, the coverage task may further define that the coverage needs to be accomplished in a plurality of heights thus requiring different autonomous vehicles to be operated to accomplish the multi-dimension coverage task. For example, a certain coverage task may define a photography operation of the certain geographical at several highest, for example, high altitude and low altitude. In such case different autonomous vehicles having different operational parameters may be operated to accomplish the multi-dimension (multi height) coverage task, for example, a high altitude drone having one or more high resolution and wide view angle (field) imaging sensors to execute the high altitude photography operation and a lower altitude drone to execute the low altitude photography operation.

Figure 2:
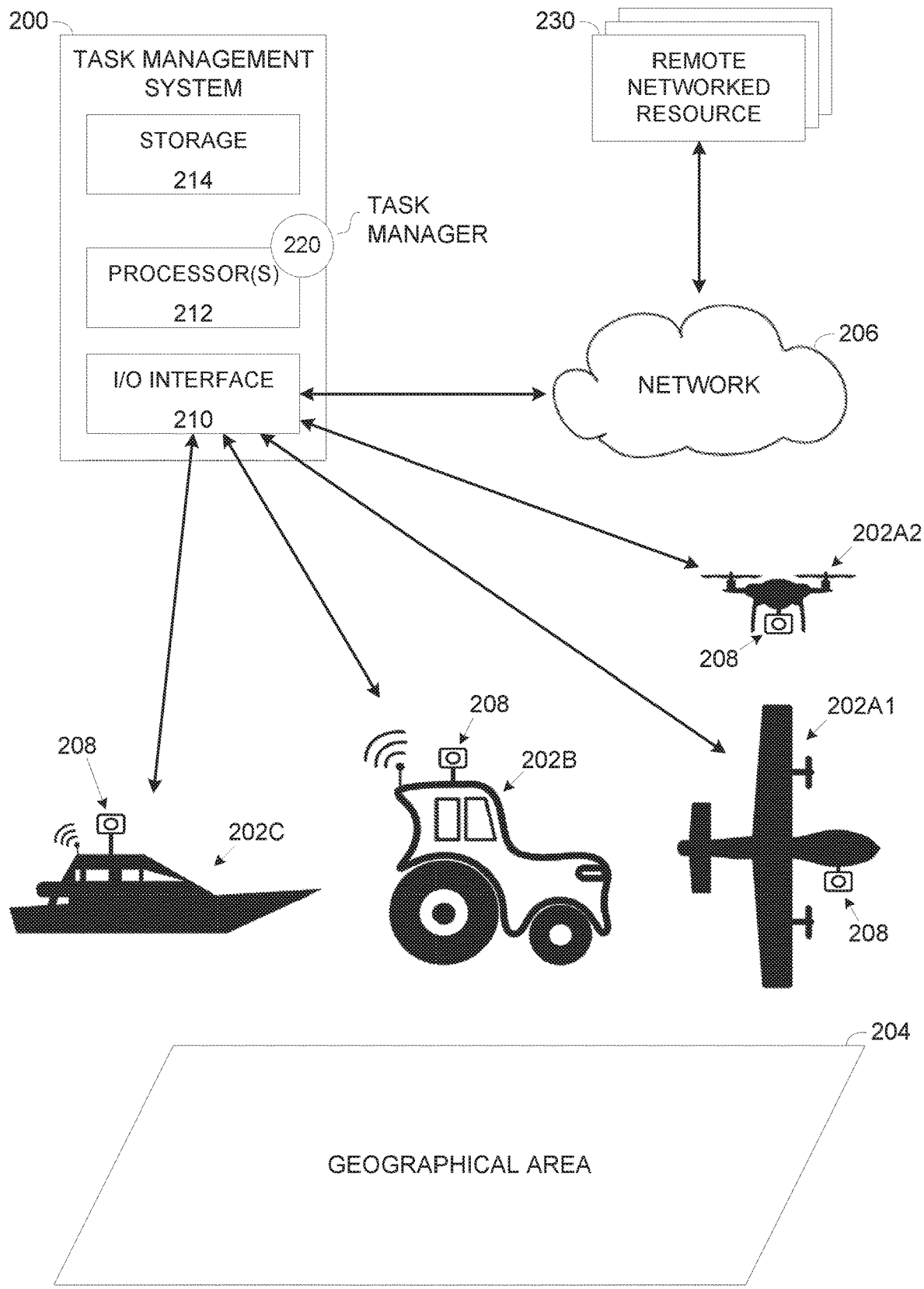
FIG. 2 is a schematic illustration of an exemplary system for iteratively operating different autonomous vehicles to optimally accomplish a coverage task, according to some embodiments of the present invention.

Reference is also made to FIG. 2, which is a schematic illustration of an exemplary system for iteratively operating different autonomous vehicles to optimally accomplish a coverage task, according to some embodiments of the present invention. An exemplary task management system 200, for example, a computer, a server, a computing node, a cluster of computing nodes, a cloud computing platform and/or the like may be deployed to execute the iterative process 100 for selecting a plurality of autonomous vehicles 202 and generating operation instructions for the selected of autonomous vehicles 202 to complete a coverage task in one or more geographical areas 204.

The autonomous vehicles 202 may include various vehicles, for example, aerial vehicles 202A, ground vehicles 202B, naval vehicles 202C and/or the like. The autonomous aerial vehicles 202A may include one or more types of aerial vehicles, for example, a large Unmanned Aerial Vehicle (UAV) 202A1, a small drone 202A2 and/or the like. The autonomous ground vehicles 202B may include one or more types of ground vehicles, for example, a car, a track, a cargo vehicle, an agricultural mobile machine (e.g. tractors, combine, etc.) and/or the like. The autonomous naval vehicles 202C may include one or more types of naval vehicles, for example, a boat, a hovercraft, a submarine and/or the like.

The autonomous vehicles 202 may be designed, adapted, configured and/or equipped to conduct one or more automated operations, specifically one or more automated operations in one or more of the geographical areas 204, for example, a monitoring operation to monitor the area, a photography operation to capture images of the area, a picking operation for picking items detected in the area, a placing operation for placing items in the area monitoring and/or the like.

Some of the autonomous vehicles 202 may be further designed, adapted, configured and/or equipped to conduct one or more agricultural automated operations in one or more geographical areas 204 specifically agricultural areas, for example, a farm, a field, an orchard, a garden, a plantation, a livestock grazing area (pasture), a fish pond and/or the like. Such agricultural automated operations conducted in the geographical area(s) may include, for example, spraying one or more materials (e.g. water, fertilizers, pesticides, food, etc.), picking agricultural items (e.g. fruit, vegetable, eggs, etc.) detected in the area, placing items (e.g. food) in the area, irrigating crops, pollinating crops, pruning crops, trimming crops, harvesting crops, seeding the area and/or the like. Such autonomous vehicles 202 utilized for one or more of the agricultural automated operations may include one or more of the autonomous ground vehicles 202B, for example, an autonomous tractor, an autonomous combine, an autonomous spraying vehicle and/or the like. The autonomous vehicles 202 utilized for one or more of the agricultural automated operations may further include one or more of the autonomous aerial vehicles 202A, for example, a UAV 202A1, a drone 202A2 and/or the like.

In particular, the autonomous vehicles 202 may include a plurality of different autonomous vehicles which may differ from each other in one or more of their operational parameters, for example, type (ground, aerial, naval), availability, speed, minimal/maximal altitude (if applicable), range, load capability, coverage precision, coverage rate, a cost of operation, a current location, an energy related operation time expectancy and/or the like. The energy related operation time may define an expected operation time and/or duration estimated based on energy, for example, fuel, battery, and/or the like that is available to the respective autonomous vehicle 202.

The autonomous vehicles 202 and their respective operational parameters may be stored in one or more records, for example, a file, a library, a structure and/or the like which may be used to evaluate the availability and capabilities of each of the autonomous vehicles 202. Moreover, the record created for the autonomous vehicles 202 and their operational parameters may support a Vehicle Application Programming Interface (V-API) which may be used by one or more software applications to access the record.

For example, assuming several types of the autonomous vehicles 202 are configured to conduct one or more of the agricultural automated operations, for example, spraying material(s) on crops planted in a certain agricultural area, for example, a field and/or the like. Such autonomous vehicles 202 may include, for example, the spraying autonomous ground vehicle 202B and the drone 202A2. The spraying autonomous ground vehicle 202B and the drone 202A2 may differ in one or more of their operational parameters, specifically such operational parameters which directly impact their respective coverage capacity. For example, the spraying autonomous ground vehicle 202B may have a significantly high coverage rate as it may be capable of spraying a large area per minute, may have a large load capacity requiring reduce refill operations which may be time consuming and/or the like. However, the spraying autonomous ground vehicle 202B may be limited in its coverage precision due to one or more limitations, for example, inability to operate in limited size areas, inability to bypass obstacles in the certain agricultural area, for example, trees, structures and/or the like. The drone 202A2 on the other hand, may have a significantly high coverage precision since it may be accurately operated to reach specific areas and locations within the certain agricultural area while avoiding obstacle(s) to accurately spray the specific area(s). However, the drone 202A2 may be limited in its coverage rate due to one or more limitations, for example, limited load capacity requiring frequent time consuming refill cycles, limited range and/or the like Moreover, one or more of the autonomous vehicles 202 may be equipped (e.g. installed, mounted, etc.) with one or more sensors 208 configured to capture sensory data of the environment of the autonomous vehicles 202. The sensor(s) 208 may employ one or more sensing technologies and methods. For example, the sensors 208 may include one or more imaging sensors, for example, a camera, a video camera, a night vision camera, an Infrared camera, a thermal imaging camera and/or the like configured to capture sensory data, specifically imagery data, for example, images, video streams and/or the like of the environment of the autonomous vehicles 202. In another example, the sensors 208 may include one or more audio sensors, for example, a microphone and/or the like configured to capture sensory data, specifically sound data, for example, audio and sound in the environment of the autonomous vehicles 202 such that one or more audio maps and/or sound maps may be created based on the captured sound data. In another example, the sensors 208 may include one or more depth and/or ranging sensors, for example, a Light imaging, Detection, and Ranging (LiDAR) sensor, a Radio Detection and Ranging (RADAR) sensor, a Sound Navigation Ranging (SONAR) sensor and/or the like configured to capture sensory data, specifically ranging data, for example, depth data, range data and/or the like in the environment of the autonomous vehicles 202 such that one or more depth maps, range maps and/or distance maps may be created based on the captured ranging data. Some of the autonomous vehicles 202 may therefore differ from each other in one or more operational parameters of their sensors 208, for example, a capturing mode (e.g. day, night, both), a resolution, an efficient activation distance, a Field of View (FOV), a wavelength, a shatter speed, a brightness, a contrast and/or the like.

The sensors 208 and their respective operational parameters may be stored in one or more records, for example, a file, a library, a structure and/or the like which may be used to evaluate the availability and capabilities of each of the sensors 208. Moreover, the record created for the sensor(s)

208 and their operational parameters may support a Sensor Application Programming Interface (S-API) which may be used by one or more software applications to access the record.

The capability, capacity and/or effectiveness of each of the different autonomous vehicles 202 to conduct one or more of the automated operations are naturally derived and depended on the operational parameters of the respective operational parameters of the respective autonomous vehicle 202 and optionally on the operational parameters of its sensor(s) 208 (if exists).

The task management system 200 may include an Input/Output (I/O) interface 210 for communicating with one or more of the drones 202. The I/O interface 210 may include one or more wired and/or wireless interfaces, for example, a Universal Serial Bus (USB) interface, a serial interface, a Radio Frequency (RF) interface, a Bluetooth interface and/or the like.

The I/O interface 210 may further include one or more network and/or communication interfaces for connecting to a network 206 comprising one or more wired and/or wireless networks, for example, a Local Area Network (LAN), a Wireless Local Area Network (WLAN), a Wide Area Network (WAN), a Municipal Area Network (MAN), a cellular network, the internet and/or the like. Via the I/O interface 210, the task management system 200 may connect to the network 206 for communicating with one or more of the drones 202. The management system 200 connected to the network 206 may further communicate with one or more remote networked resources 230, for example, a client terminal operated by a user for controlling the task management system 200, a computing resource, a storage resource, a database, a service, a cloud resource and/or the like.

The processor(s) 212, homogenous or heterogeneous, may include one or more processors arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache memory and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a task manager application 220 for executing the process 100 and/or part thereof. The task manager 220 may optionally utilize and/or facilitate one or more hardware elements integrated and/or utilized in the task management system 200, for example, a circuit, a component, an Integrated Circuit (IC), an Application Specific Integrated Circuit (ASIC), a Field Programmable Gate Array (FPGA), a Digital Signals Processor (DSP) and/or the like.

The task management system 200 may be an independent system which may execute the task manager 220 to select the autonomous vehicles 202, calculate instructions for operating them accordingly and communicate with the management system 200 to provide them with the instructions. However, the task management system 200, specifically the task manager 220 may be executed by one or more of the autonomous vehicles 202 themselves such that the autonomous vehicles 202 execute the process 100 and/or part thereof. Moreover, during each iteration of the process 100, one or more of the autonomous vehicles 202 selected for the respective iteration may execute the task manager 220 (more specifically an instance of the task manager 220) to execute the process 100 and/or a part thereof, for example, the respective iteration.

The task manager 220 may use the V-API and/or the S-API to access the respective records storing the information of the autonomous vehicles 202 and of the sensors 208 in order to use this information for executing the process 100, specifically selecting and calculating operation instructions for a plurality of autonomous vehicles 202 to complete a coverage task of a certain geographical area 204.

As shown at 102, the process 100 starts with the task manager 220 receiving a task for automatic execution by the autonomous vehicles 202, in particular an automated task to be carried out by the autonomous vehicles 202 in a certain geographical area 204. The task manager 220 may receive the task from one or more sources, for example, a user and/or operator using a client device 230 (e.g. computer, tablet, Smartphone, etc.), an automated service operating according to a predefined schedule and/or the like.

In particular, the task manager 220 may receive a plurality of task parameters defining the automated task, for example, one or more aspects and/or requirements of the task, the certain geographical area 204 and/or the like. The task parameters may thus include, for example, an automated operation required by the task, a timing (time, date, etc.) of the task, a duration of the task, an expected revenue of the task, a cost of the task, a size of the certain geographical area 204, a location of the certain geographical area 204, a type of the certain geographical area 204 and/or the like. The task parameters may also define a required coverage outcome or result, for example, a coverage threshold which the coverage achieved by autonomous vehicles 202 is expected and/or required to fulfil and/or exceed. The task parameters may further define one or more parameters relating to periodic characteristics of the task, for example, how many times does the task need to be repeated, a schedule for repeating the task and/or the like.

For example, the task parameters of a first task may define a photography operation of a certain geographical area 204, for example, a cattle grazing area which may be used to detect cattle scattered in the certain geographical area 204. The task parameters of the first task may further define the location and size of the cattle grazing area, for example, coordinates of the cattle grazing area and/or the like. The task parameters of the first task may also define one or more timing parameters, for example, when should the photography operation be carried out, what is the latest time to receive the photography footage of the cattle grazing area, what is the maximal duration of the photography operation and/or the like. The task parameters of the first task may further define a minimal resolution required for the photography footage, a cost and/or budget allocated for the photography operation, for example, a maximal cost.

In another example, the task parameters of a second task may define an agricultural automated operation, for example, spraying a pesticide material over a certain geographical area 204, for example, an orchard planted with a plurality of fruit trees. As described for the first task, the task parameters of the second task may define the location and size of the orchard, one or more timing parameters of the second task and/or the like. The task parameters of the second task may further define one or more requirements for the pesticide, for example, a type of the pesticide, a maximal and/or minimal amount (volume) of pesticide per tree, per square meter, a dispensing method and/or the like.

In another example, the task parameters of a third task may define a placing operation in a certain geographical area 204, for example, dispersing Corexit over a sea area in which oil is spilled, for example, from a ship, an oil rig and/or the like. As described for the first task, the task parameters of the third task may define the location and size of the oil spilled sea area, one or more timing parameters of the third task and/or the like. The task parameters of the third task may further define one or more requirements for the Corexit dispersant, for example, a maximal and/or minimal amount of Corexit per square meter, a dispersing method and/or the like.

As shown at 104, the task manager 220 may select one or more autonomous vehicles 202 based on analysis of the task parameters of the coverage task. In particular, the task manager 220 may evaluate the operational parameters of each of a plurality of types of the autonomous vehicles 202 with respect to the task parameters and select one or more autonomous vehicles 202 of a first type (first autonomous vehicle) to execute a first stage of the coverage task of the certain geographical area 204.

The task manager 220 may select the first autonomous vehicle(s) 202 estimated, evaluated and/or expected to best (even if suboptimal) cover the certain geographical area 204 according to the task parameters. This means that while the first autonomous vehicle(s) 202 are selected by the task manager 2220 to efficiently cover the certain geographical area 204, the coverage of the certain geographical area 204 by the first autonomous vehicle(s) 202 may not be optimal and some areas within the certain geographical area 204 may be thus left at least partially uncovered.

Typically, the first autonomous vehicle(s) 202 selected by the task manager 220 for the first iteration of the process 100, i.e., the first stage of the coverage task is characterized by high coverage rate thus able to cover large distances and/or areas in a relatively short time often at the expense of reduced coverage precision. As such the first autonomous vehicle(s) 202 may fail to completely and/or accurately cover the entire certain geographical area 204.

Continuing the previous tasks examples, for the first task, for example, which defines the photography operation of the certain geographical area 204 (the cattle grazing area), the task manager 220 may select one or more of the UAVs 202A1 as the first autonomous vehicles according to its operational parameters which are estimated to best cover, i.e. capture imagery data of the cattle grazing area. For example, the task manager 220 may determine that based on the operational parameters of the UAV 202A1, for example, the resolution of the imaging sensor 208 mounted on the UAV 202A1, a single UAV 202A1 may be used to effectively capture imagery data (cover) of the cattle grazing area. In particular, the task manager 220 may select the UAV 202A1 over one or more of the drones 202A2 mounted with imaging sensor(s) 208 which may provide higher precision coverage, i.e. higher precision imagery data but at a significantly lower coverage rate thus requiring deployment of a large number of drones 202A2 and/or a long time to complete capturing the imagery data (cover) of the cattle grazing area. These limitations of deploying many drones 202A2 and/or deploying them for an extended time period may lead to violation of one or more of the task parameters, for example, exceed allocated cost, exceed timing requirement(s) and/or the like.

In another example, for the second task, which defines the pesticide material spraying operation of the certain geographical area 204, i.e. the orchard, the task manager 220 may select one or more autonomous ground vehicles 202B, for example, an autonomous tractor according to its operational parameters which are estimated to best cover, i.e. spray the pesticide in the orchard. For example, the task manager 220 may determine that based on the operational parameters of the autonomous tractor, for example, the load (volume) of pesticide the autonomous tractor may carry, three autonomous tractors may be may be used to effectively spray the pesticide (cover) the trees in the orchard. In particular, the task manager 220 may select the autonomous tractor ground vehicles 202B over one or drones 202A2 which may provide higher precision coverage, i.e. higher precision spraying of the pesticide but at a significantly lower coverage rate thus requiring deployment of a large number of drones 202A2 and/or operating the drones 202A2 for a long time to complete spraying all tress in the entire orchard. These limitations of deploying many drones 202A2 and/or deploying them for an extended time period may lead to violation of one or more of the task parameters, for example, exceed allocated cost, exceed timing requirement(s) and/or the like.

In another example, for the third task, which defines the Corexit dispersant operation of the certain geographical area 204. i.e. the sea area, the task manager 220 may select one or more autonomous naval vehicles 202C, for example, an autonomous boat 202C according to its operational parameters which are estimated to best cover, i.e. disperse Corexit over the sea area spilled with oil. For example, the task manager 220 may determine that based on the operational parameters of the autonomous boat 202C, for example, the load (volume) of Corexit the autonomous boat 202C may carry, five autonomous boats 202C may be used to effectively disperse the Corexit (cover) over the sea area in which the oil is spilled. In particular, the task manager 220 may select the autonomous boats 202C over one or drones 202A2 which may provide higher precision coverage, i.e. higher precision dispersing of the Corexit but at a significantly lower coverage rate thus requiring deployment of a large number of drones 202A2 and/or operating the drones 202A2 for a long time to complete dispersing the Corexit over the entire sea area spilled with oil. These limitations of deploying many drones 202A2 and/or deploying them for an extended time period may lead to violation of one or more of the task parameters, for example, exceed allocated cost, exceed timing requirement(s) and/or the like.

As shown at 106, the task manager 220 may compute and output instructions for operating each of the first autonomous vehicle(s) 202 selected to execute the first stage (first iteration) of the coverage task in a first movement path to cover at least partially the certain geographical area 204. In particular, the task manager 220 may compute the first movement path(s) for the first autonomous vehicle(s) 202 according to the operational parameters of the selected first autonomous vehicle 202 with respect to the task parameters.

Continuing the previous tasks examples, for the first task, for example, the task manager 220 may compute a first movement (flight) path for the UAV 202A1 according to the maximal resolution of the imaging sensor 208 mounted on the UAV 202A1 and based on the maximum flying altitude the UAV 202A1, the task manager 220 may compute instructions for operating the UAV 202A1 in a preferred flight path over the cattle grazing area, for example, a relatively high altitude in a certain pattern to effectively (e.g. shortest time, lowest energy consumption, etc.) to capture imagery data of the cattle grazing area. In another example, for the second task, the task manager 220 may compute a first movement (drive) path for each of the autonomous tractor ground vehicles 202B according to the maximal load of pesticide each autonomous tractor may carry and based on the maximal speed of the autonomous tractor. The task manager 220 may compute instructions for operating the autonomous tractors in certain patterns to effectively (e.g. shortest time, maximal pesticide utilization, lowest energy consumption, etc.) spray the pesticide over the trees in the orchard. In another example, for the third task, the task manager 220 may compute a first movement (sail) path for each of the autonomous boats 202C according to the maximal load of Corexit each autonomous boat 202C may carry and based on the maximal speed of the autonomous boat. The task manager 220 may compute instructions for operating the autonomous boats 202C in certain patterns to effectively (e.g. shortest time, maximal Corexit utilization, lowest energy consumption, etc.) disperse the Corexit over the sea area spilled with oil.

Optionally, the task manager 220 may execute steps 104 and 106 together to select the first autonomous vehicle(s) 202 and/or the number of first autonomous vehicles 202 to execute the first stage of the coverage task, i.e., the first iteration of the process 100. This may be desirable or even essential since the coverage performance of the selected and/or evaluated first autonomous vehicle(s) 202, for example, efficiency, cost effectiveness and/or other performance criteria may depend on the movement path(s) computed for these first autonomous vehicle(s) 202 according to their operational parameters with respect to the task parameters.

The task manager 220 may select the first autonomous vehicle(s) 202 which are estimated, based on their operational parameters and possibly according to the first movement path(s) computed for them based on their operational parameters, to cover the certain geographical area 204 and/or part thereof in a best and desirably an optimal manner. The coverage of the certain geographical area 204 by the first autonomous vehicle(s) 202 may be defined and/or expressed according to one or more selection and/or optimization functions and/or a combination thereof.

For example, the task manager 220 may select the first autonomous vehicle(s) 202 according to an optimization function defining a minimal total number of the first autonomous vehicles 202 is required for achieving a certain coverage percentage of the certain geographical area 204. For example, in the first task example, the task manager 220 may select the UAVs 202A1 over the drones 202A2 as the first autonomous vehicles 202 since the UAVs 202A1 may reach a certain coverage percentage, for example, 80% in a certain time period with a significantly reduced number of vehicles compared to the drones 202A2.

In another example, the task manager 220 may select the first autonomous vehicle(s) 202 according to an optimization function defining a minimal cost is spent for operating the first autonomous vehicles 202 to achieve a certain coverage percentage of the certain geographical area 204. For example, in the second task example, the task manager 220 may select the autonomous tractor 202B as the first autonomous vehicles 202 since a significantly small number of autonomous tractors 202B may be required to reach the certain coverage percentage compared to an extremely large number of drones 202A2 required to reach the same coverage percentage in particular in the same time period. Operating only a limited number of autonomous tractors 202B as the first autonomous vehicles 202 may be therefore significantly more cost effective compared to operating the drones 202A2 as the first autonomous vehicles 202.

In another example, the task manager 220 may select the first autonomous vehicle(s) 202 according to an optimization function defining a completion of the coverage task in a shortest or minimal duration of time, i.e. a minimal time duration from start to finish of the coverage task. For example, in the third task example, the task manager 220 may select the autonomous boats 202C as the first autonomous vehicles 202 since the autonomous boats 202C may carry a significantly large load of the Corexit and may be thus operated in the sea area spilled with oil for a long duration without wasting time for returning to reload Corexit as may be required by the drones 202A2 which may each carry only a limited load of Corexit or the UAVs 202A1 which may be operated for limited time period before it needs to be refueled thus wasting precious time.

In another example, the task manager 220 may select the first autonomous vehicle(s) 202 according to an optimization function defining completion of the coverage task as soon as possible, i.e. a fastest completion of the coverage task. For example, in the third task example, the task manager 220 may select the UAVs 202A1 as the first autonomous vehicles 202 over the autonomous boats 202C in case the autonomous boats 202C are not currently available or their base (current location) is significantly distant from the certain geographical area 204. In such case the UAVs 202A1 may be relatively quickly deployed to load and dispense the Corexit over the sea area spilled with oil compared to the time it may require for the autonomous boats 202C to arrive at the sea area spilled with oil and start dispensing Corexit.

The task manager 220 may output the instructions computed for each of the first autonomous vehicle(s) 202 which may be used for operating each of the first autonomous vehicle(s) 202 in certain geographical area 204 according to the movement path computed for the respective first autonomous vehicle 202.

As described herein before, the task manager 220 may output the instructions by transmitting them to the first autonomous vehicle(s) 202 via the I/O interface, optionally via the network 206. However, in case the task manager 220 and/or part of it is executed by one or more of the first autonomous vehicle(s) 202, the task manager 220 may output the first movement path instructions to one or more control systems of the first autonomous vehicle(s) 202, for example, a movement control system, a navigation system and/or the like.

Optionally, the task manager 220 may select, adjust the selection and/or adjust the first movement path(s) computed for the first autonomous vehicle(s) 202 according to one or more environmental and/or weather conditions identified in the certain geographical area 204, for example, light, rain, snow, fog, clouds and/or the like. The task manager 220 may apply one or more methods to identify the environmental and/or weather conditions, for example, receive data from one or more weather services 230, analyze imagery data of the certain geographical area 204 captured by one or more satellites, analyze data received from one or more operators using client devices 230 and/or the like.

For example, continuing the first task example defining the photography operation in the certain geographical area 204, i.e., the cattle grazing area, assuming that the task manager 220 identifies low clouds conditions at the cattle grazing area. In such case, the task manager 220 may adjust the flight path of the UAV 202A1 selected as the first autonomous vehicle 202 to a lower altitude that is below the clouds. This may require the task manager 220 to adjust the movement pattern computed for the UAV 202A1 since the reduced altitude may yield a smaller field of view which may require a tighter flight pattern (more runs) to cover the cattle grazing area.

In another example, continuing the third task example defining the Corexit dispersant operation in the certain geographical area 204, i.e., the sea area spilled with oil, assuming that the task manager 220 identifies high sea with large waves at the oil spill sea area. In such case, the task manager 220 may select one or more UAVs 202A1 to disperse the Corexit over the oil spill instead of selecting the autonomous boat 202C since the Corexit dispersant capability of the autonomous boat 202C may be significantly degraded due to the high waves while the autonomous boat 202C UAV(s) 202A1 may be significantly immune to the effects of the high sea.

Optionally, the task manager 220 calculates instructions for operating the first autonomous vehicle(s) 202 in only part of the certain geographical area 204 such that some of the certain geographical area 204 is not covered by the first autonomous vehicle(s) 202. For example, assuming that the first autonomous vehicle(s) 202 may be limited in reaching and/or operating in one or more segments, parts and/or portions of the certain geographical area 204 identified based on the analysis of the certain geographical area 204, the task manager 220 may calculate instructions for operating the first autonomous vehicle(s) 202 to avoid covering the limited access and/or operation segments of the certain geographical area 204.

As shown at 108, the task manager 220 may analyze coverage of the certain geographical area 204 by the first autonomous vehicle(s) 202. The task manager 220 may analyze the coverage by analyzing imagery data, for example, one or more images and/or one or more video clips depicting the certain geographical area 204 after the first autonomous vehicle(s) 202 are operated to cover it.

The task manager 220 may obtain the imagery data from one or more sources. For example, the task manager 220 may communicate with one or more of the first autonomous vehicle(s) 220 to receive imagery data of the certain geographical area 204 captured by one or more of the imaging sensor(s) 208 mounted on the first autonomous vehicle(s) 220. In another example, the task manager 220 may compute and output instructions for operating one or more monitoring autonomous vehicles 220 other that the first autonomous vehicle(s) 220. The monitoring autonomous vehicle(s) 220 mounted with one or more imaging sensors such as the imaging sensor 208 may be operated in the certain geographical area 204 to capture the imagery data and provide it to the task manager 220. In another example, the imagery data may be captured and delivered to the task manager 220 by one or more second autonomous vehicles selected to further cover the certain geographical area 204 as described in detail herein after. In another example, the task manager 220 may obtain the imagery data of the certain geographical area 204 from one or more of the remote networked resources, for example, a satellite imagery service providing imagery data of various geographical areas, specifically imagery data depicting the certain geographical area 204.

The task manager 220 may apply one or more image processing and/or computer vision analysis tools, algorithms and/or methods as known in the art for analyzing the imager data depicting the certain geographical area 204.

As shown at 110, based on the analysis of the coverage conducted by analyzing the imagery data depicting the certain geographical area 204 after covered at least partially by the first autonomous vehicle(s) 202, the task manager 220 may identify one or more uncovered segments of a plurality of segments constituting the certain geographical area 204 which were not covered by the first autonomous vehicle(s) 202.

Moreover, based on the coverage analysis, the task manager 220 may segment the entire certain geographical area 204 to a plurality of segments and may further classify each of the plurality of segments as covered and uncovered. An uncovered segment may include a fully uncovered segment, a partially uncovered segment and/or an uncertainly covered segment which may not be deterministically and/or definitively classified as covered or uncovered.

One or more of the uncovered segment(s) identified in the certain geographical area 204 may be uncovered due to one or more limitations in the operational parameters of the first autonomous vehicle(s) 202 selected in the first iteration to cover the certain geographical area 204, for example, limited operation time, limited range, limited load capacity, limited coverage precision and/or the like. One or more other uncovered segments identified in the certain geographical area 204 may be uncovered due to discrepancies between the actual coverage of the first autonomous vehicles and the predicted coverage estimated based on the coverage capabilities of the selected autonomous vehicles. Such discrepancies may result from environmental and/or weather conditions, for example, wind gusts, limited visibility, precipitation and/or the like which may have affected the actual coverage capacity of the first autonomous vehicle(s) 202 compared to their nominal and/or estimated coverage capacity.

Continuing the first task example defining the photography operation in the certain geographical area 204 (the cattle grazing area), the task manager 220 may analyze the photographic footage (imagery data) captured by the UAV(s) 202A1 and may classify each of the segments of the cattle grazing area as covered, i.e., sufficiently depicted by the photographic footage or uncovered, i.e. not depicted, partially depicted or uncertainly depicted by the photographic footage. For example, the task manager 220 may identify one or more segments which are at least partially blocked by one or more objects (e.g. trees, cliffs, hills, clouds, etc.) and are thus insufficiently depicted in the photographic footage captured by the UAV(s) 202A1. In another example, the task manager 220 may identify that due to insufficient resolution and/or low lighting conditions, one or more of the segments are not clearly depicted in the photographic footage captured by the UAV(s) 202A1. In another example, for the second task, which defines the pesticide spraying operation of the certain geographical area 204, i.e. the orchard, the task manager 220 may analyze imagery data depicting the orchard after the autonomous tractors 202B are operated in the orchard to identify one or more uncovered segments of the orchard in which the trees are not sprayed, partially and/or insufficiently sprayed and/or uncertainly sprayed. In another example, for the third task, which defines the Corexit dispersant operation of the certain geographical area 204. i.e. the sea area, the task manager 220 may analyze imagery data depicting the sea rea spilled with oil after the autonomous boats 202C are operated in the sea area to identify one or more uncovered segments of the sea in which there is still oil or oil residues and/or segments which could not be decisively determined to contain no oil residues.

As described herein before, while the first autonomous vehicle(s) 202 are selected by the task manager 220 to efficiently cover the certain geographical area 204, the coverage of the certain geographical area 204 by the first autonomous vehicle(s) 202 may not be complete and it is therefore expected that the task manager 220 may identify one or more uncovered segments in the certain geographical area 204.

As described herein before, the task manager 220 may optionally calculate instructions for operating the first autonomous vehicle(s) 202 in only part of the certain geographical area 204 such that one or more segments of the certain geographical area 204 are intentionally uncovered.

As shown at 112, the task manager 220 may select one or more second autonomous vehicles 202 of a second type which are different from the first autonomous vehicles 202 to further cover one or more of the uncovered segments in the certain geographical area 204. In particular, the task manager 220 may evaluate the operational parameters of each of a plurality of types of the autonomous vehicles 202 with respect to the task parameters and select one or more second autonomous vehicles 202 to execute a second stage of the coverage task of the certain geographical area 204.

The task manager 220 may select the second autonomous vehicle(s) 202 estimated, evaluated and/or expected to best cover the uncovered segments detected in the certain geographical area 204. Typically, the second autonomous vehicle(s) 202 selected by the task manager 220 for the second iteration of the process 100, i.e., the second stage of the coverage task is characterized by high coverage precision which is thus able to accurately cover the specific uncovered segment(s) in the certain geographical area 204. The second autonomous vehicle(s) 202 characterized by high coverage precision may often be limited in their coverage rate thus able to cover relatively small areas and/or require extended time for the coverage task.

Continuing the previous tasks examples, for the first task, for example, which defines the photography operation of the cattle grazing area, the task manager 220 may select one or more of the drones 202A2 as the second autonomous vehicles mounted with one or more imaging sensors 208. The task manager 220 may select the drone(s) 202A2 based on its operational parameters, specifically, highly flexible maneuvering capability, significantly low minimal flying altitude and/or the like which may enable the drone(s) 202A2 to accurately capture imagery data of the uncovered segment(s) identified in the cattle grazing area. In another example, for the second task, which defines the pesticide spraying operation of the orchard, the task manager 220 may select of the drones 202A2 as the second autonomous vehicles, specifically drone(s) 202A2 which are designed, configured and/or operated to carry the pesticide and spray it over an area of interest. The task manager 220 may select the drone(s) 202A2 based on its operational parameters, specifically, its highly flexible maneuvering capability and significantly low minimal flying altitude which may be highly suitable for accurate spraying of the pesticide on the trees in the uncovered segment(s) identified in the orchard. In another example, for the third task, which defines the Corexit dispersant operation over the sea area spilled with oil, the task manager 220 may select may select of the drones 202A2 as the second autonomous vehicles, specifically drone(s) 202A2 which are designed, configured and/or operated to carry the Corexit and disperse it over an area of interest. The task manager 220 may select the drone(s) 202A2 based on its operational parameters, specifically, its highly flexible maneuvering capability and significantly low minimal flying altitude which may be highly suitable for accurate dispersing the Corexit over the uncovered segment(s) identified in the sea area spilled with oil.

As shown at 114, the task manager 220 may compute and output instructions for operating each of the second autonomous vehicle(s) 202 selected to execute the second stage (second iteration) of the coverage task and operate according to a second movement path in the certain geographical area 204. In particular, the task manager 220 may compute the second movement path(s) according to the operational parameters of the selected first autonomous vehicle 202 with respect to the uncovered segment(s) identified in the certain geographical area 204.

For example, the second movement path(s) computed by the task manager 220 for a certain second autonomous vehicle 202 may define a preferred coverage pattern in one or more certain uncovered segments identified in the certain geographical area 204 such that the certain second autonomous vehicle 202 may cover the uncovered segment(s) in the shortest time, the shortest travel length, the minimal fuel consumption, least amount of used material (e.g. pesticide, water, fertilizer, etc.) and/or the like. In another example, the second movement path(s) computed by the task manager 220 for a certain second autonomous vehicle 202 may define an optimal path between a plurality of uncovered segments identified in the certain geographical area 204 such that the certain second autonomous vehicle 202 may move between the uncovered segments in the shortest time, the shortest travel length, the minimal fuel consumption and/or the like. In another example, the task manager 220 may select multiple second autonomous vehicles 202 and compute their second movement paths to define an optimal distribution of a plurality of uncovered segments identified in the certain geographical area 204 between the multitude of second autonomous vehicles 202.

Optionally, as described for the first autonomous vehicles 202, the task manager 220 may select, adjust the selection and/or adjust the second movement path(s) computed for the second autonomous vehicle(s) 202 according to one or more of the environmental and/or weather conditions identified in the certain geographical area 204.

As described for the first autonomous vehicles 202, the task manager 220 may select the second autonomous vehicle(s) 202 which are estimated, based on its operational parameters and possibly according to the second movement path(s) computed for it based on its operational parameters, to cover the uncovered segment(s) in the certain geographical area 204 and/or part thereof in a best and desirably an optimal manner. The coverage of the uncovered segment(s) by the second autonomous vehicle(s) 202 may be defined and/or expressed according to one or more of the selection and/or optimization functions and/or a combination thereof.

Optionally, the task manager 220 may initiate two successive iterations simultaneously, for example, initiate steps 112 and 114 before step 106 is complete. This means that the second autonomous vehicle(s) 202 may be operated in the certain geographical area 204 simultaneously with the first autonomous vehicle(s). For example, the second autonomous vehicle(s) 202 may be operated in one or more (first) parts or portions of the certain geographical area 204 which are already covered by the first autonomous vehicle(s) 202 simultaneously with the first autonomous vehicle(s) 202 operated in one or more other (second) parts or portions of the certain geographical area 204. In particular, task manager 220 may analyze the coverage achieved by the first autonomous vehicle(s) 202 in the first part(s) based on imagery data depicting the first part(s) before the first autonomous vehicle(s) 202 complete covering the entire certain geographical area 204. Based on the coverage analysis of the first part(s), the task manager may select the second autonomous vehicle(s) 202 and calculate instructions for operating the second autonomous vehicle(s) 202 to cover the first part(s), specifically uncovered segment(s) detected in the first part(s).

Optionally, the task manager 220 may execute steps 112 and 114 together to select the second autonomous vehicle(s) 202 and/or the number of second autonomous vehicles 202 to execute the second stage of the coverage task, i.e., the second iteration of the process 100. This may be desirable or even essential since the coverage performance of the selected and/or evaluated second autonomous vehicle(s) 202, for example, efficiency, cost effectiveness and/or other performance criteria may depend on the second movement path(s) computed for these second autonomous vehicle(s) 202 according to their operational parameters with respect to the uncovered segment(s) and/or the task parameters.

Moreover, the task manager 220 may select the first autonomous vehicle(s) 202 according to availability and selection of the second autonomous vehicle(s) 202. For example, based on the analysis of the task requirements, the task manager 220 may determine that selecting a certain type of autonomous vehicle 202 as the first autonomous vehicle(s) 202 and another type of autonomous vehicle 202 as the second autonomous vehicle(s) 202 may yield optimal coverage of the certain geographical area 204. In such case, the task manger 220 may therefore select the first autonomous vehicle(s) 202 of the certain type based on the selection of the second autonomous vehicle(s) 202 of the other type.

As shown at 116, the task manager 220 may analyze the coverage of the certain geographical area 204 after the second autonomous vehicle(s) 202 are operated in the certain geographical area 204 to cover at least partially one or more of the uncovered segment(s). The task manager 220 may analyze the coverage as described in step 108 based on imagery data depicting the certain geographical area 204 after the second autonomous vehicle(s) 202 complete their operation.

As shown at 118, which is a conditional step, in case, based on the coverage analysis, the task manager 220 may compare the coverage to one or more threshold defined by one or more of the task parameters of the coverage task.

In case the coverage exceeds the threshold(s), the process 100 branches to 120 and end the task. Otherwise the process 100 may branch to 112 to initiate an additional iteration to further cover the certain geographical area 204. The iterative process may be repeated and additional iterations may be initiated until reaching one or more of the thresholds or until the task is aborted. During each iteration, the task manager 220 may again analyze the coverage to identify uncovered segment(s) and may compete the coverage against the threshold.

The threshold may define one or more criteria for the sufficient coverage. For example, the threshold may define one or more coverage criteria which may be defined by the task parameters, for example, a percentage of the certain geographical area 204 that is definitely covered, an absolute area of the certain geographical area 204 that is definitely covered and/or the like. In another example, the threshold may define one or more coverage criteria which may be defined by the task parameters, for example, a deadline (date, time) for completing the task, a maximal duration for completing the task and/or the like. In another example, the threshold may define one or more cost criteria which may be defined by the task parameters, for example, an absolute maximal operational cost of the autonomous vehicles 202 operated to accomplish the coverage task, a maximal operational cost of the autonomous vehicles 202 operated to accomplish the coverage task with respect to a maximal expected revenue from the outcome of the task and/or the like.

Optionally, one or more of the thresholds may be combined and/or aggregated, for example, a maximal cost threshold may be combined with a minimal coverage threshold such that first threshold exceeded during the iterative process 100 may cause the task manager 220 to branch to 120 and terminate the coverage task.

In case the task manager 220 branches to 112 to initiate another iteration, the task manager 220 may again select one or more autonomous vehicles 202 and compute instructions for operating them accordingly to further cover the certain geographical area 204, in particular the uncovered segment(s) identified in the certain geographical area 204. The task manager 220 may select the autonomous vehicle(s) 202 which are estimated to best cover the uncovered segment(s) based on their operational parameters. The autonomous vehicle(s) 202 selected during each additional iteration may therefore typically include one or more of the second autonomous vehicle(s) 202. However, in some scenarios the task manager 220 may select one or more autonomous vehicles 202 of a third type (third autonomous vehicle 202) which may have one or more operational parameters different from those of the second autonomous vehicle 202. Moreover, in some cases, the third autonomous vehicle(s) 202 may include one or more of the first autonomous vehicles 202. The task manager 220 may compute and output instructions for a third movement path(s) for operating the third autonomous vehicle(s) 202 to cover the yet uncovered segment(s) identified in the certain geographical area 204.

For example, to continue the first task example, assuming that one or more of the plurality of segments of the certain geographical area 204, specifically the cattle grazing area remain uncovered after the first autonomous vehicle(s) 202, specifically the UAVs 202A1 were operated to capture photographic coverage of the cattle grazing area and even after the second autonomous vehicle(s) 202, specifically the drones 202A2 were operated to capture photographic coverage of uncovered segments identified in the cattle grazing area. This means that even after operating both the UAVs 202A1 and the drones 202A2, one or more of the segments constituting the cattle grazing area are still not depicted, partially depicted or uncertainly depicted by the imagery data captured by the UAVs 202A1 and/or the drones 202A2. In such case, the task manager 220 may branch to 112 to initiate another iteration and select again one or more of the drones 202A2 to capture additional photographic footage of the still uncovered segment(s). However, alternatively, the task manager 220 may select one or more autonomous vehicles 202 of a different type, for example, ground vehicles 202B, for example, an autonomous car which may move in close proximity or even within the still uncovered segment(s) to capture the missing photographic footage. The task manager 220 may compute and output instructions for operating the ground vehicle(s) 202B selected as the third autonomous vehicle(s) according to a third movement path computed by the task manager 220 for each of the third autonomous vehicle(s), i.e., for each of the ground vehicle(s) 202B.

As shown at 120, the task manager 220 may end the coverage task typically after the coverage outcome results reach or exceed the coverage threshold and/or one or more other thresholds defined by the task parameters are reached or exceeded as described herein before.

Optionally, prior to operating any of the autonomous vehicle(s) 202, the task manager 220 may simulate one or more simulations of the coverage achieved by one or more candidates for the first autonomous vehicle(s) 202 followed by the coverage achieved by one or more candidates for the second autonomous vehicle(s) 202. The task manager 220 may then select the first and second autonomous vehicles 202 according to the simulation presenting an optimal coverage according to one or more of the optimization functions, for example, a minimal operational cost for operating the first and second autonomous vehicles 202, a shortest completion of the coverage task, deployment of a minimal number of autonomous vehicles 202 and/or the like as well as a combination thereof.

Reference is now made to FIG. 3A, FIG. 3B, FIG. 3C, FIG. 3D, FIG. 3E and FIG. 3F, which are schematic illustration of an exemplary certain geographical area gradually covered by iteratively operating different autonomous vehicles to optimally accomplish coverage of the certain geographical area, according to some embodiments of the present invention.

A task management system such as the task management system 200 may execute a task manager such as the task manager 220 to select and operate a plurality of different autonomous vehicles such as the autonomous vehicles 202 according to the process 100 in order to optimally cover an exemplary geographical area 204A such as the certain geographical area 204. The coverage task executed by the task manager 220 according to the process 100 may be defined by the task requirements to include one or more agricultural operations, for example, spraying a material, for example, a pesticide on crops planted in the certain geographical area 204A, for example, an agricultural area such as, for example, a corn field.

Figure 3A:
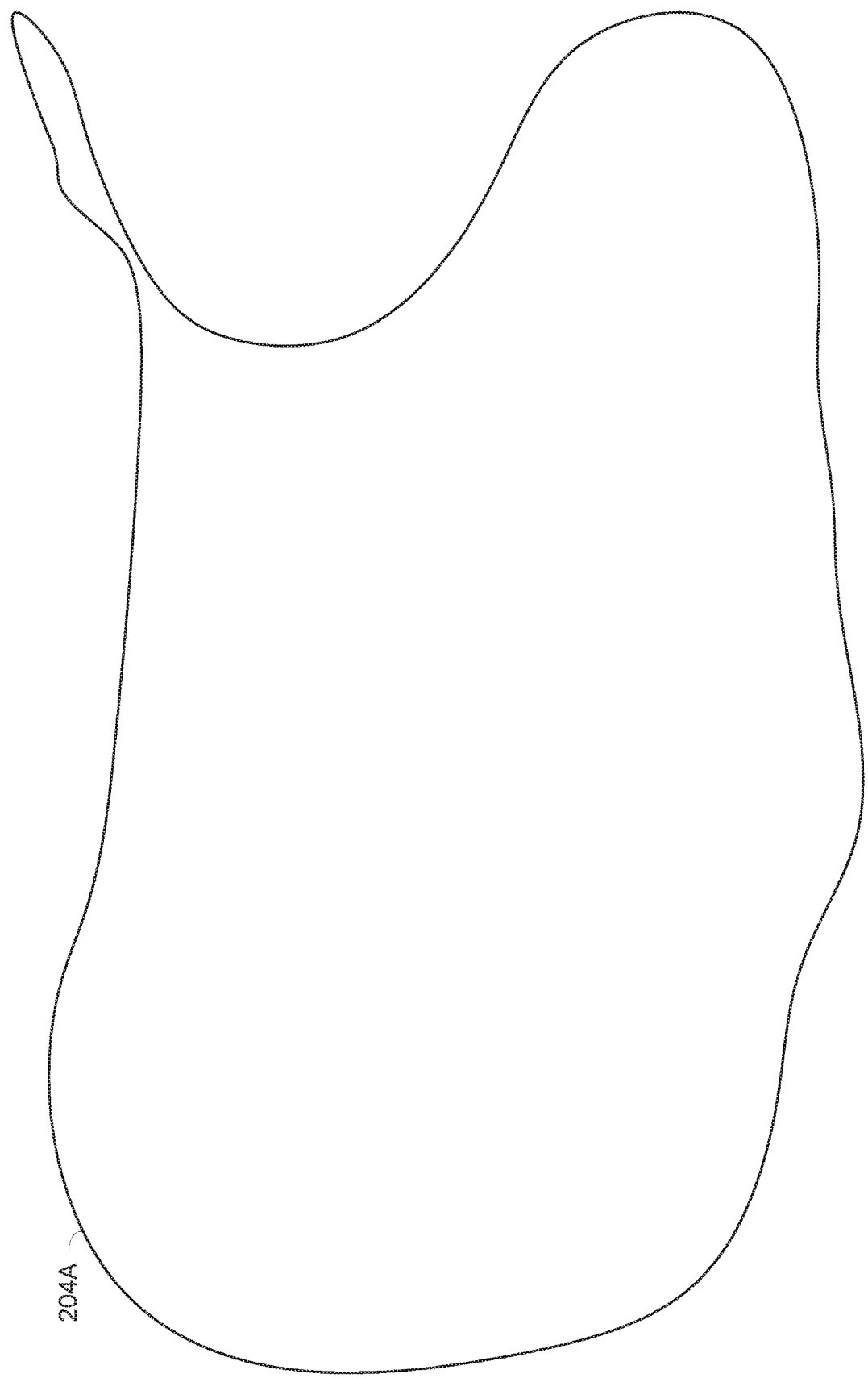

As seen in FIG. 3A, the corn field 204A is initially uncovered, i.e. the crops in the corn field 204A are not sprayed with the pesticide.

The task manager 220 executing the process 100 may initially select one or more autonomous vehicles 202 of a first type (first autonomous vehicle(s)), for example, the ground agricultural machinery 202B such as, for example, the autonomous tractor and may compute first movement path(s) for the autonomous tractor(s) to optimally traverse the corn field 204 and spray it as described in steps 104 and 106 of the process 100.

Figure 3B:
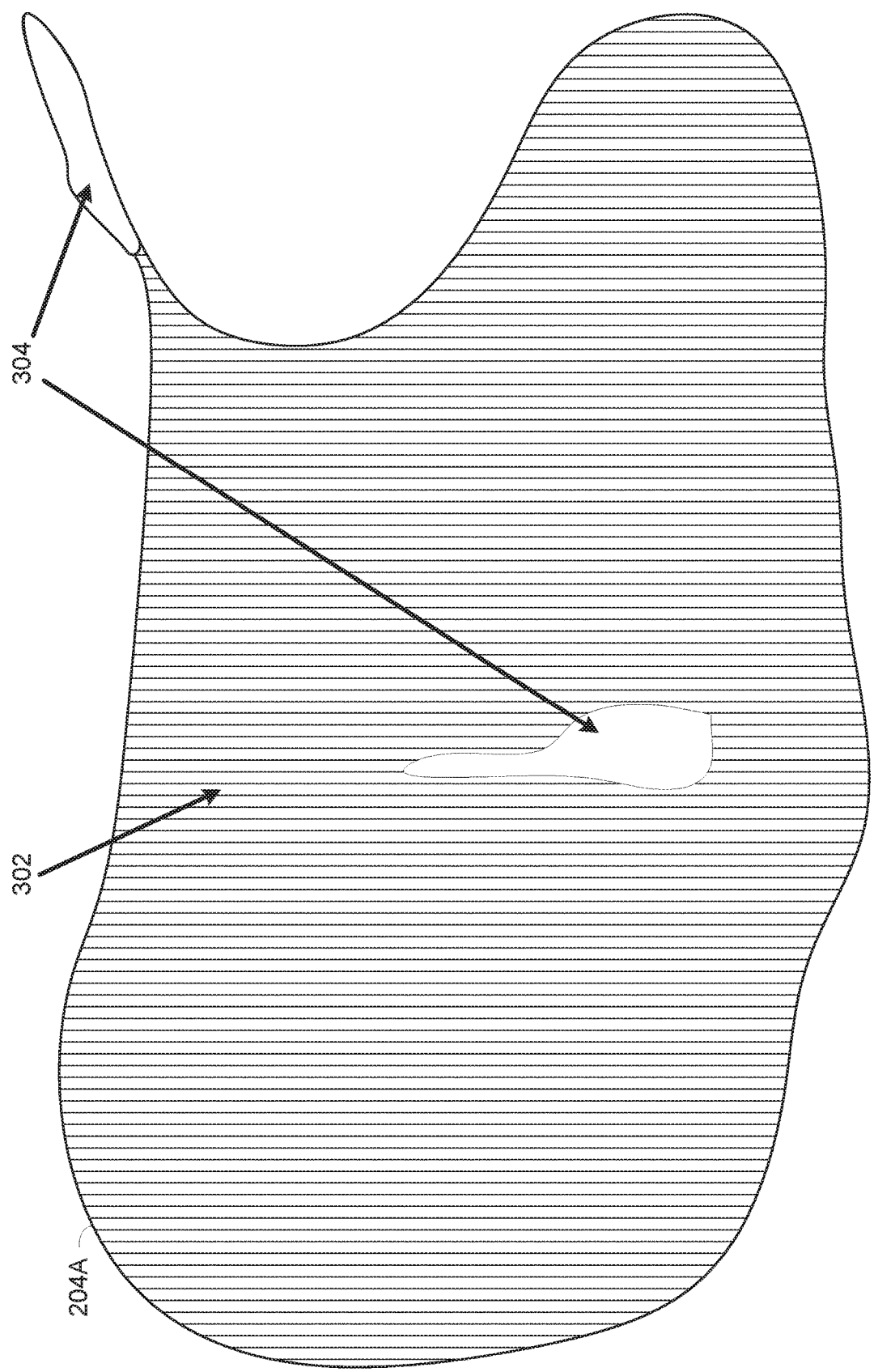

In a first exemplary scenario, as shown in FIG. 3B, the task manager 220 analyzing the coverage of the corn field 204 as described in steps 108 and 110 may classify segments of the corn field 204A as covered segments 302 or uncovered segments 304.

The task manager 220 may then select one or more autonomous vehicles 202 of a second type (second autonomous vehicle(s)), for example, the drones 202A2 for the second iteration and may compute second movement path(s) for operating the drone(s) 202A2 to optimally traverse the uncovered segments 304 and spray them as described in steps 112 and 114 of the process 100.

After the drones 202A2 are operated to spray the crops in the uncovered segments 304, the task manager 220 may analyze the coverage of the corn field 204 as described in step 116 and may further compare the coverage to one or more of the thresholds as described in step 118, for example, a threshold defining a complete coverage (100%) of the corn field 204. As shown in FIG. 3C, based on the coverage analysis the task manager 220 may determine that all segments of the corn field 204A are fully covered 302 and may finish the process 100 as the coverage task is accomplished according to the requirements defined for the coverage task.

Figure 3D:
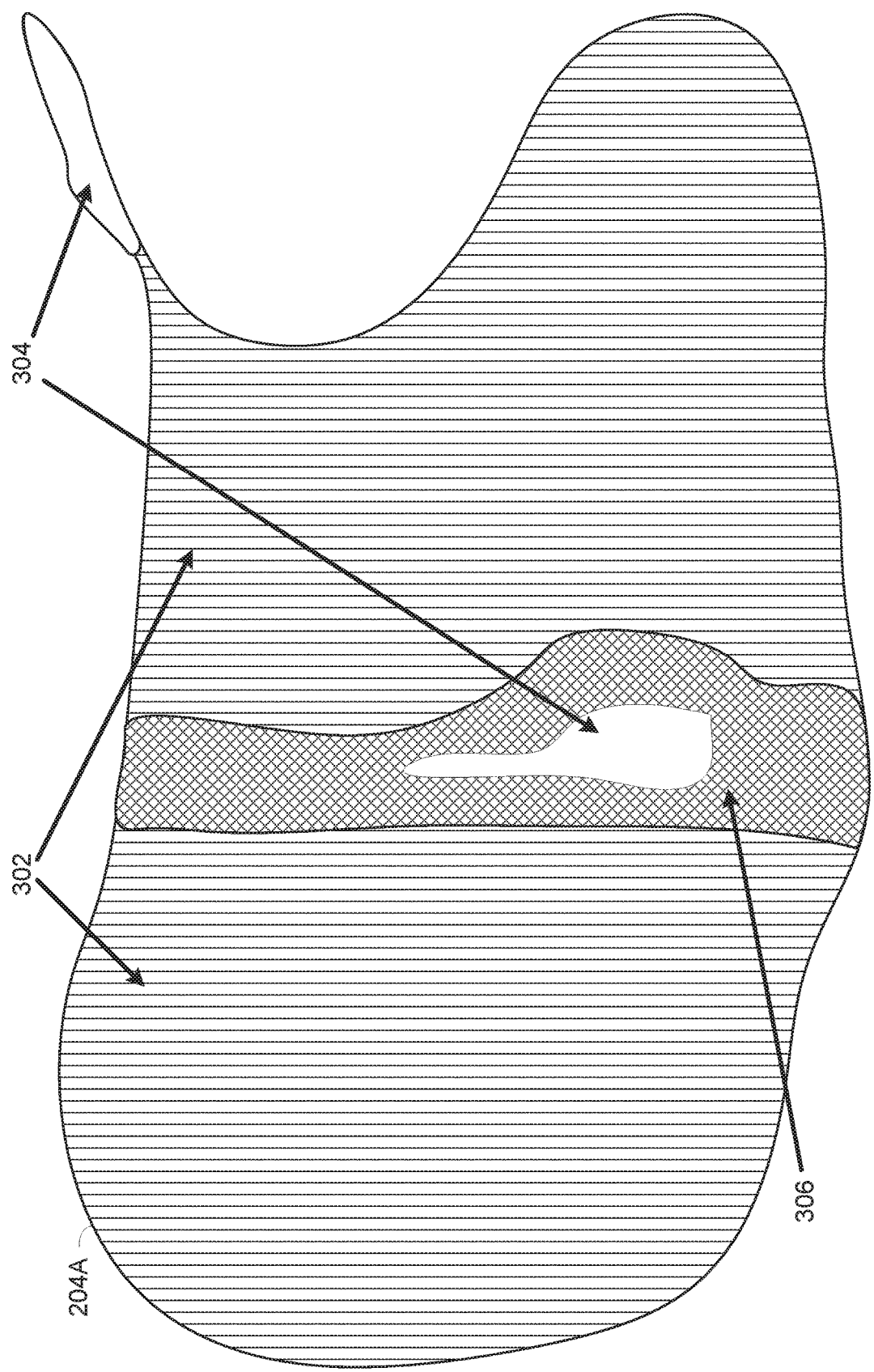

In a second exemplary scenario, as shown in FIG. 3D, the task manager 220 analyzing the coverage of the corn field 204 after the first iteration (stage) of the process 100 as described in steps 108 and 110 may classify segments of the corn field 204A as covered segments 302, uncovered segments 304 and uncertainly covered segments 306. The uncertainly covered segments 306 may not be decisively classified as covered or uncovered due to one or more limitations in capturing the imagery data used to analyze the coverage of the corn field 204A. For example, in case the imagery data is captured by the autonomous tractor(s) during the first iteration, the view angle and/or FOV of ground level imaging sensor(s) such as the imaging sensor 208 deployed in the autonomous tractor(s) may be limited thus providing limited and/or partial imagery data of the corn field 204A. In another example, in case the imagery data is captured by one or more UAVs 202A1 operated to captured imagery data of the corn field 204A, imaging sensor(s) 208 deployed in the high speed and/or high altitude UAVs 202A2 may capture limited and/or partial imagery data of the corn field 204A.

Since the uncertainly covered segments 306 may be potentially uncovered, the task manager 220 may need to operate the second autonomous vehicle(s) 202, for example, the drone(s) 202A2 to spray the uncertainly uncovered segments 306.

However, in such case, the task manager 220 may determine that it may be preferable to first increase confidence of the classification accuracy of the uncertainly covered segments 306 by analyzing the coverage of the corn field 204A based on additional imagery data of the corn field 204A, specifically of the uncertainly uncovered segments 306 before initiating the second iteration. Moreover, the additional capturing imagery data may be improved compared to the imagery data used to initially analyze the coverage, for example, higher quality, higher resolution, higher definition, different wavelength and/or the like.

The task manager 220 may apply one or more criteria to determine whether to operate one or more autonomous vehicles 202 to capture additional imagery data of the corn field 204A, specifically of the uncertainly covered segments 306 to improve the coverage analysis and more accurately classify the corn field 204A to covered and uncovered segments. For example, the task manager 220 may determine that it may be more cost effective to operate one or more drones 202A2 to capture the additional imagery data and deterministically classify the uncertainly covered segments 306 compared to operating the second autonomous vehicle(s) 202, for example, the drone(s) 202A2 to spray the uncertainly covered segments 306. In another example, the task manager 220 may determine that it may be more time efficient to operate the drone(s) 202A2 to capture the additional imagery data for deterministically classifying the uncertainly covered segments 306 compared to operating the drone(s) 202A2 to spray the uncertainly covered segments 306.

Figure 3E:
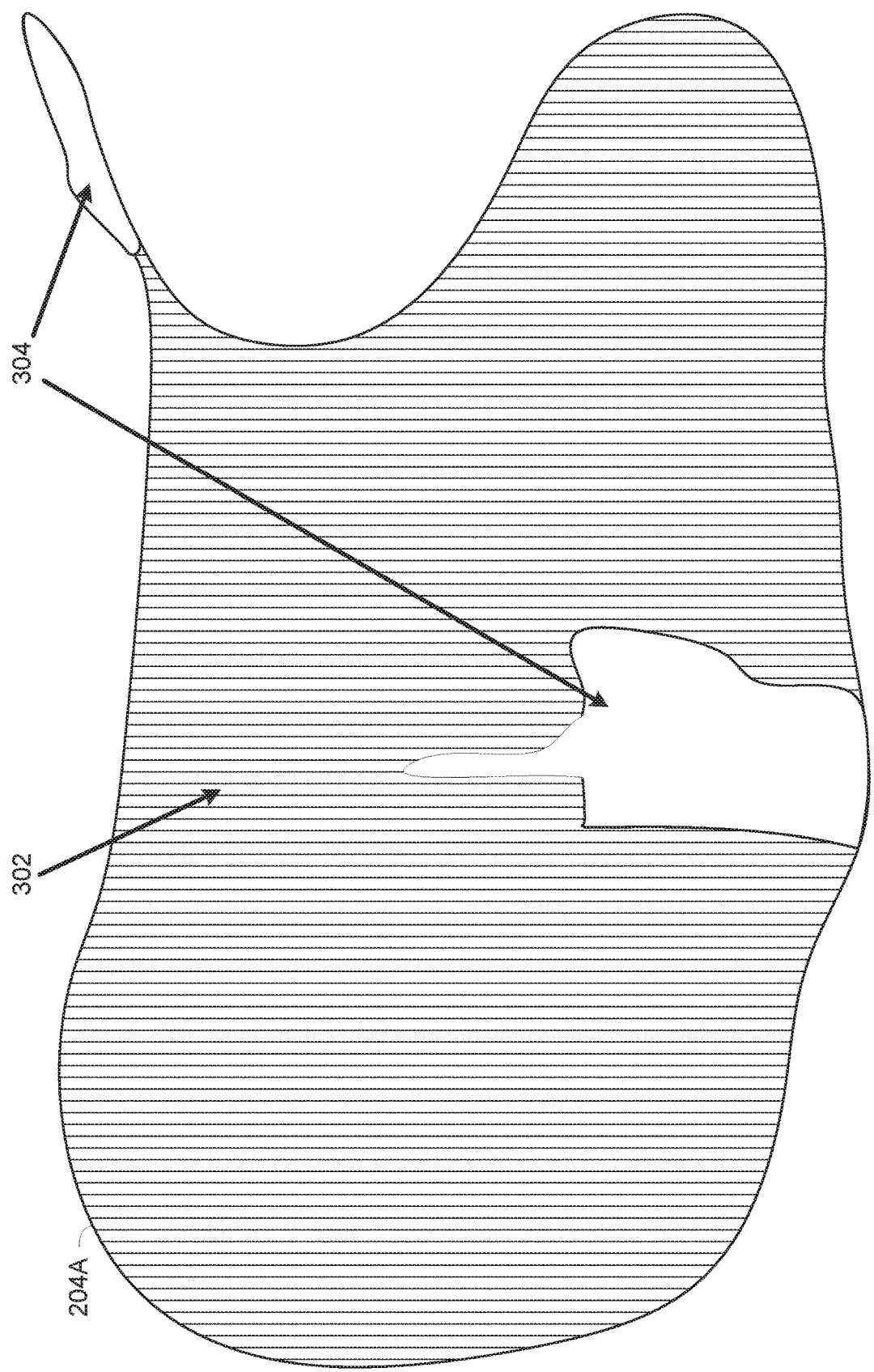

As shown in FIG. 3E, the task manager 220 analyzing the coverage of the corn field 204 after based on the additional imagery data of the corn field 204A, specifically of the uncertainly covered segments 306, may improve the classification of the classification of the segments of the corn field 204A to covered segments 302 and uncovered segments 304.

As described herein before for the first embodiment, the task manager 220 may then select the second autonomous vehicle(s), i.e. the drone(s) 202A2 and may compute second movement path(s) for operating the drone(s) 202A2 to optimally traverse the uncovered segments 304 and spray them. After the drones 202A2 complete their operation, the task manager 220 may again analyze the coverage of the corn field 204 as described in step 116 and may further compare the coverage to one or more of the thresholds, for example, the complete coverage threshold.

Based on the coverage analysis of the corn field 204A, for example, as shown in FIG. 3C, the task manager 220 may determine that the coverage of the corn field 204A complies (exceeds) with the threshold, and may finish the process 100 as described in step 120.

Figure 3F:
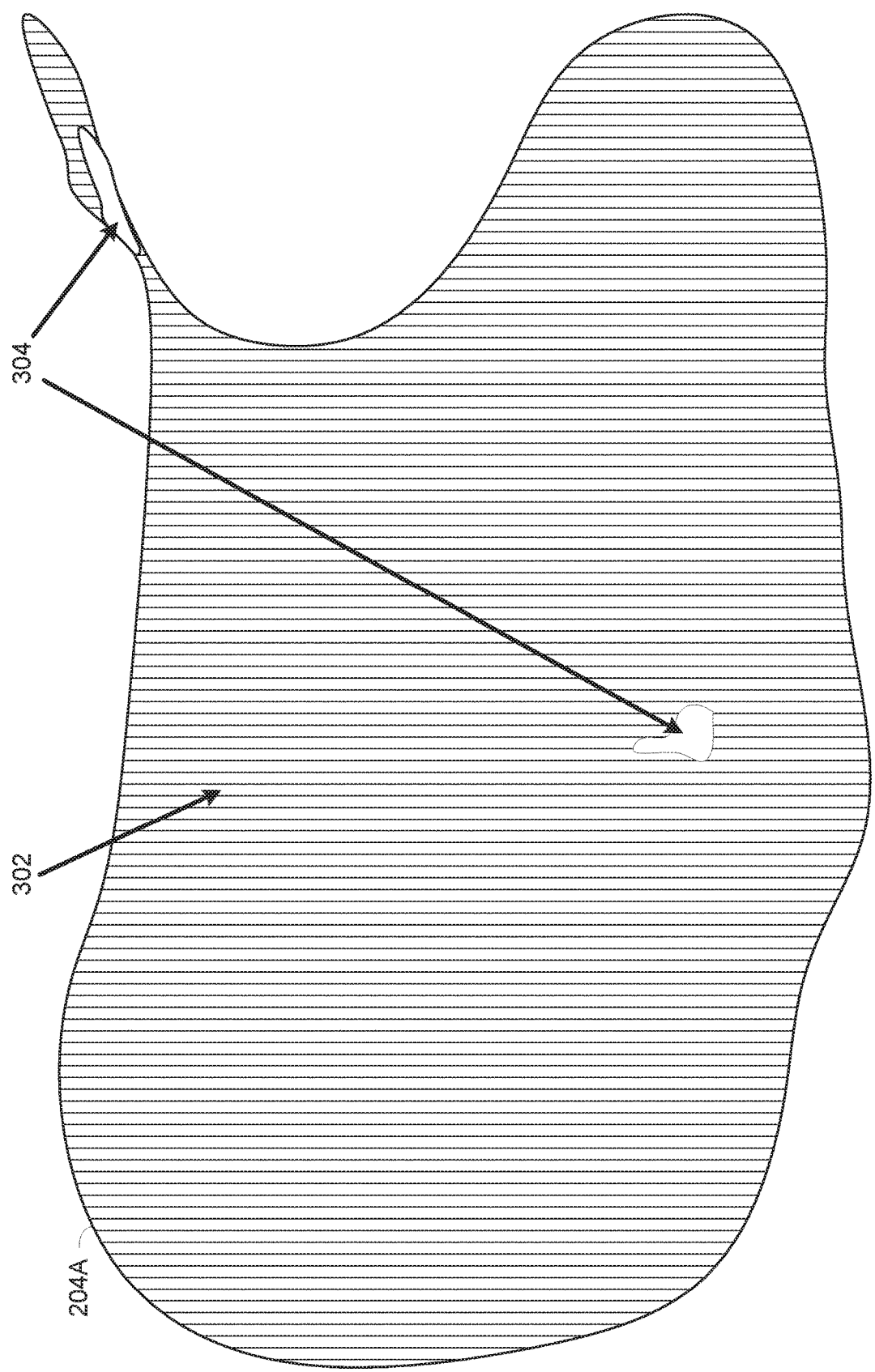

However, based on the coverage analysis of the corn field 204A, for example, as shown in FIG. 3F, the task manager 220 may determine that the coverage of the corn field 204A does not comply with the threshold since one or more uncovered segments 204 and/or uncertainly covered segments 306 are detected in the imagery data depicting the corn field 240A after operation of the second autonomous vehicle(s) 202, i.e. the drone(s) 202A2.

In such case, as described herein before, the task manager 220 may branch to 112 to initiate one or more additional iterations and select one or more of the autonomous vehicles 202 to further spray the pesticide in the uncovered segments 204 detected in the corn field 204A. While the autonomous vehicles selected by the task manager 220 in the additional iteration(s) may be the same as selected in the previous iterations, i.e. the autonomous tractor and/or the drone 202A2, the task manager 220 may optionally select autonomous vehicle(s) 202 of one or more different types, i.e., third autonomous vehicles 202, fourth autonomous vehicles 202 and so on.

Following is a numerical example demonstrating the advantage of applying the task manager 220 to execute the process 100 for a certain agricultural coverage task compared to traditional operation of autonomous vehicles 202 to complete the agricultural coverage task.

Assuming the certain geographical area 204 is an orchard occupying a large area and planted with a million trees where the revenue derived from each tree is 100$. Further assuming the coverage task includes an agricultural operation, for example, spraying a pesticide on the trees in the orchard. Traditional methods may apply a single autonomous vehicle 202 to execute the pesticide spraying task, for example, ground agricultural machinery 202B such as, for example, the autonomous tractors.

Exemplary costs of the autonomous tractors are as follows:
Setup cost is 100,000$.
A single spraying path of the autonomous tractors in the orchard costs 3$ per tree with a 90% probability that the tree is actually sprayed with the pesticide.
Two spraying paths of the autonomous tractors in the orchard cost 6$ per tree with a 95% probability that the tree is actually sprayed with the pesticide.
Three spraying paths of the autonomous tractors in the orchard cost 9$ per tree with a 98% probability that the tree is actually sprayed with the pesticide.
Four spraying paths of the autonomous tractors in the orchard cost 12$ per tree with a 100% probability that the tree is actually sprayed with the pesticide.

The revenue from the orchard maintained according to the traditional methods may be therefore the total revenue from the trees deducted by the costs for spraying the pesticide as follows:
For the single spraying path operation yielding a 90% coverage: 0.9*1,000,000*100−1,000,000*3−100,000=$86,900,000
For the two spraying paths operation yielding a 95% coverage: 0.95*1,000,000*100−1,000,000*6−100,000=$88,900,000
For the three spraying paths operation yielding a 98% coverage: 0.98*1,000,000*100−1,000,000*9−100,000=$88,900,000
For the four spraying paths operation yielding a 100% coverage: 1*1,000,000*100−1,000,000*12−100,000=$87,900,000

As evident, the maximal revenue is yield from the two paths and three paths spraying operations with the two spraying paths operation naturally being the preferred choice. While the three spraying paths operation may yield a similar total revenue as the two spraying paths operation, the four spraying paths operation yields a reduced total revenue.

However, applying the task manager 220 executing the process 100 to select a plurality of different autonomous vehicles 202 to execute the coverage task, for example, the first and second autonomous vehicles 202, may yield improved results as demonstrated herein after.

The exemplary first autonomous vehicle 202, for example, the ground agricultural machinery 202B such as, for example, the autonomous tractor may have a high coverage rate thus capable of rapidly spraying large portions of the certain geographical area 204, i.e. the orchard, while the coverage precision may be somewhat reduced. The exemplary second autonomous vehicle 202, for example, one or more of the drones 202A2 on the other hand may have a high coverage precision thus able to spray individual trees in the orchard but have a significantly reduced coverage rate, in particular compared to the high coverage rate autonomous tractor.

As described in step 108 of the process 100, the task manager 220 analyzes coverage of the orchard based on imagery data of the orchard captured by the first autonomous vehicle 202B, the second autonomous vehicle 202A2 and/or the monitoring autonomous vehicle 202. Capturing the imagery data may thus increase the cost of each spraying path operation.

Exemplary costs of the autonomous tractors and the drone(s) 202A2 are as follows:
The cost of a single spraying path operation conducted by the autonomous tractors including capturing of post spraying imagery data is 3.1$.
Setup cost of the drone(s) 202A2 is 50,000$.
A single path of the drone(s) 202A2 is 20$ per tree with a 100% probability that the tree is actually sprayed with the pesticide.

The revenue from the orchard maintained using a plurality of autonomous vehicles 202 according to the process 100 methods may be as follows:
For the single spraying path operation of the autonomous tractors followed by a spraying operation of the drone(s) 202A yielding a 95% coverage: 0.9*1,000,000*100−1,000,000*3.1−100,000−50,000−0.05*1,000,000*20=$92,650,000
For the single spraying path operation of the autonomous tractors followed by a spraying operation of the drone(s) 202A yielding a 100% coverage: 0.9*1,000,000*100−1,000,000*3.1−100,000−50,000−0.1*1,000,000*20=$96,6500,000

As evident, comparing the single autonomous vehicle operation according to the traditional methods to the multiple autonomous vehicles operation according to the process 100 may yield significantly improved revenues. For the 95% coverage, the revenue using the traditional method may be $88,900,000 while using the process 100 to operate multiple autonomous vehicles may yield a revenue of $92,650,000. Moreover, for the 100% coverage, the revenue using the traditional method may be reduced compared to the 95% coverage for a total of $87,900,000 while using the process 100 to operate multiple autonomous vehicles may yield an increased revenue of $96,6500,000.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms autonomous vehicle and sensor technologies are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of automatically operating autonomous vehicles to accomplish a coverage task, comprising:
   receiving a plurality of task parameters defining a coverage task in a certain geographical area;
   calculating and outputting instructions for operating at least one first autonomous vehicle selected to cover at least partially the certain geographical area according to a first movement path computed according to at least one operational parameter of the first autonomous vehicle with respect to at least one of the plurality of task parameters;

identifying at least one uncovered segment of a plurality of segments constituting the certain geographical area by analyzing coverage of the certain geographical area by the at least one first autonomous vehicle operated according to the first movement path; and calculating and outputting instructions for operating at least one second autonomous vehicle selected to cover the at least one uncovered segment according to a second movement path computed according to at least one operational parameter of the second autonomous vehicle;

operating the at least one second autonomous vehicle, based on the coverage analysis, in a part of the certain geographical area already covered by the at least one first autonomous vehicle while the at least one first autonomous vehicle is still operated in another part of the certain geographical area;

wherein the at least one first autonomous vehicle and the at least one second autonomous vehicle are selected to optimally accomplish the coverage task, the second autonomous vehicle having increased coverage precision and reduced coverage rate compared to the first autonomous vehicle.

2. The method of claim 1, wherein each of the first autonomous vehicle and the second autonomous vehicle is a member of a group consisting of: a ground vehicle, an aerial vehicle and a naval vehicle.

3. The method of claim 1, wherein the coverage task comprising at least one operation of a group consisting of: a monitoring operation, an agricultural operation, a picking operation and a placing operation.

4. The method of claim 1, wherein each of the plurality of task parameters defines at least one member of a group consisting of: an operation of the task, a timing of the task, a duration of the task, a revenue of the task, a cost of the task, a size of the certain geographical area, a location of the certain geographical area, a type of the certain geographical area and an outcome of the task.

5. The method of claim 1, wherein each of the plurality of operational parameters of a respective autonomous vehicle is a member of a group consisting of: a type of the autonomous vehicle, an availability of the autonomous vehicle, a speed of the autonomous vehicle, an energy related operation time expectancy, a maximal altitude of the autonomous vehicle, a minimal altitude of the autonomous vehicle, a range of the autonomous vehicle, a communication range, a load capability of the autonomous vehicle, a coverage precision of the autonomous vehicle, a coverage rate of the autonomous vehicle, a current location and a cost of operation of the autonomous vehicle.

6. The method of claim 1, wherein the coverage of the certain geographical area is determined by analyzing sensory data captured by at least one sensor deployed to monitor at least part of the certain geographical area.

7. The method of claim 6, wherein the at least one sensor is deployed in the at least one first autonomous vehicle.

8. The method of claim 6, wherein the at least one sensor is deployed in the at least one second autonomous vehicle.

9. The method of claim 6, wherein the at least one sensor is deployed in at least one monitoring autonomous vehicle operated in the certain geographical area.

10. The method of claim 1, wherein the at least one uncovered segment includes one of: a fully uncovered segment, a partially uncovered segment and an uncertainly covered segment.

11. The method of claim 1, further selecting the at least one first autonomous vehicle according to selection of the at least one second autonomous vehicle.

12. The method of claim 1, further comprising analyzing the coverage after the at least one second autonomous vehicle is operated to cover the at least one uncovered segment to identify at least one additional uncovered segment of the plurality of segments.

13. The method of claim 12, further comprising initiating at least one additional iteration of calculating and outputting instructions for operating the at least one second autonomous vehicle according to another second movement path computed according to at least one operational parameter of the at least one second autonomous vehicle to at least partly cover the at least one additional uncovered segment.

14. The method of claim 13, further comprising selecting at least one third autonomous vehicle for the at least one additional iteration and calculating and outputting instructions for operating the at least one third autonomous vehicle according to a third movement path computed according to at least one operational parameter of the at least one third autonomous vehicle to at least partly cover the at least one additional uncovered segment.

15. The method of claim 1, wherein the optimal accomplishment of the task is estimated based on a minimal number of autonomous vehicles deployed to complete the task.

16. The method of claim 1, wherein the optimal accomplishment of the task is estimated based on a minimal cost of the autonomous vehicles deployed to complete the task.

17. The method of claim 1, wherein the optimal accomplishment of the task is estimated based on a minimal time for completing the task.

18. The method of claim 1, wherein the optimal accomplishment of the task is estimated based on a minimal duration time of the task.

19. A system for automatically operating autonomous vehicles to accomplish a coverage task, comprising:
at least one input interface;
at least one output interface; and
at least one processor coupled to the at least one input interface and to the at least one output interface, the at least one processor executing a code comprising:
code instructions to receive, via the at least one input interface, a plurality of task parameters defining a coverage task in a certain geographical area;
code instructions to calculate and output, via the at least one output interface, instructions for operating at least one first autonomous vehicle selected to cover at least partially the certain geographical area according to a first movement path computed according to at least one operational parameter of the first autonomous vehicle with respect to at least one of the plurality of task parameters;
code instructions to identify at least one uncovered segment of a plurality of segments constituting the certain geographical area by analyzing coverage of the certain geographical area by the at least one first autonomous vehicle operated according to the first movement path; and
code instructions to calculate and output, via the at least one output interface, instructions for operating at least one second autonomous vehicle selected to cover the at least one uncovered segment according to a second movement path computed according to at least one operational parameter of the second autonomous vehicle;

code instructions to operate the at least one second autonomous vehicle, based on the coverage analysis, in a part of the certain geographical area already covered by the at least one first autonomous vehicle while the at least one first autonomous vehicle is still operated in another part of the certain geographical area;

wherein the at least one first autonomous vehicle and the at least one second autonomous vehicle are selected to optimally accomplish the coverage task, the second autonomous vehicle having increased coverage precision and reduced coverage rate compared to the first autonomous vehicle.

\* \* \* \* \*